(12) United States Patent
Ito

(10) Patent No.: US 9,453,992 B2
(45) Date of Patent: Sep. 27, 2016

(54) ZOOM LENS AND IMAGING APPARATUS INCLUDING THE SAME

(71) Applicant: CANON KABUSHIKI KAISHA, Tokyo (JP)

(72) Inventor: Daisuke Ito, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/552,158

(22) Filed: Nov. 24, 2014

(65) Prior Publication Data
US 2015/0146045 A1    May 28, 2015

(30) Foreign Application Priority Data

Nov. 27, 2013  (JP) .................................. 2013-245002

(51) Int. Cl.
| | |
|---|---|
| G02B 15/14 | (2006.01) |
| H04N 5/232 | (2006.01) |
| G02B 13/00 | (2006.01) |
| G02B 15/173 | (2006.01) |
| G02B 15/22 | (2006.01) |

(52) U.S. Cl.
CPC ............. *G02B 15/14* (2013.01); *G02B 13/009* (2013.01); *G02B 15/173* (2013.01); *G02B 15/22* (2013.01); *H04N 5/23296* (2013.01)

(58) Field of Classification Search
CPC ...... G02B 15/00; G02B 15/14; G02B 15/15; G02B 15/16; G02B 15/163; G02B 15/167; G02B 15/20; G02B 15/22; G02B 13/009

USPC .................................. 359/676–679, 683–687
See application file for complete search history.

(56) References Cited

U.S. PATENT DOCUMENTS

| | | | |
|---|---|---|---|
| 2011/0102906 A1* | 5/2011 | Oe ........................ | G02B 15/173 359/684 |
| 2011/0286109 A1* | 11/2011 | Nakagawa ......... | G02B 27/0062 359/690 |

FOREIGN PATENT DOCUMENTS

| | | |
|---|---|---|
| JP | 2011-053297 A | 3/2011 |
| WO | 2015075948 A1 | 5/2015 |

* cited by examiner

*Primary Examiner* — Darryl J Collins
(74) *Attorney, Agent, or Firm* — Canon U.S.A. Inc., IP Division

(57) ABSTRACT

A zoom lens includes, in order from an object side to an image side, a first lens unit having positive refractive power, a second lens unit having negative refractive power, a third lens unit having positive refractive power, and a rear lens group including one or more lens units. An interval between adjacent lens units is changed in zooming, the first lens unit is moved closer to the object side at a telephoto end than at a wide-angle end. The first lens unit includes at least four lenses. An Abbe number and a material of a positive lens included in the first lens unit satisfy predetermined values. And, a focal length f1 of the first lens unit, and an amount of movement M1 of the first lens unit at zooming from the wide-angle end to the telephoto end are appropriately set.

18 Claims, 14 Drawing Sheets

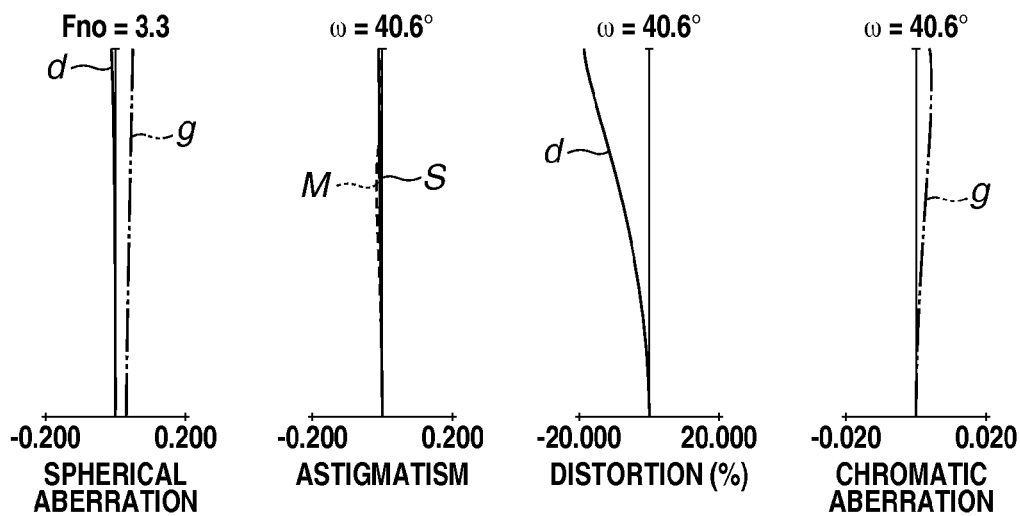
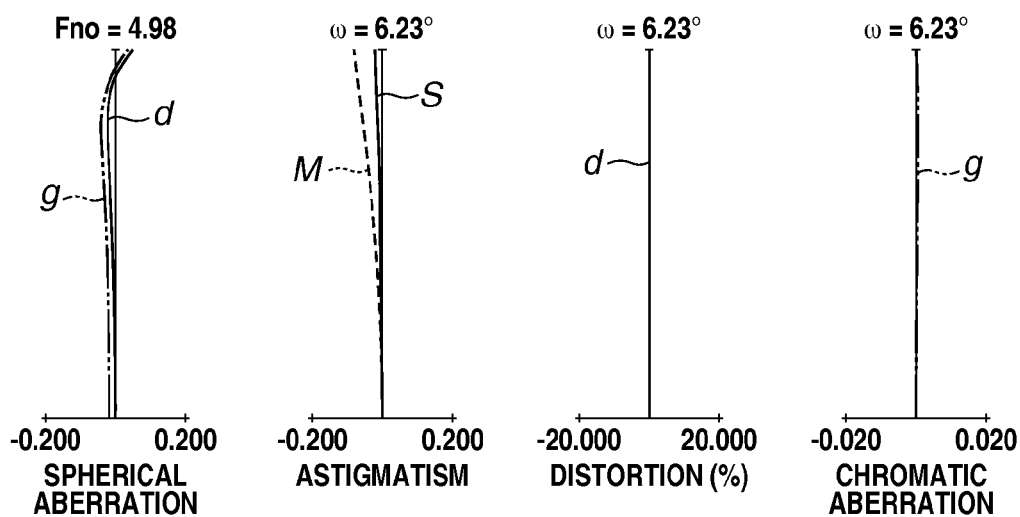
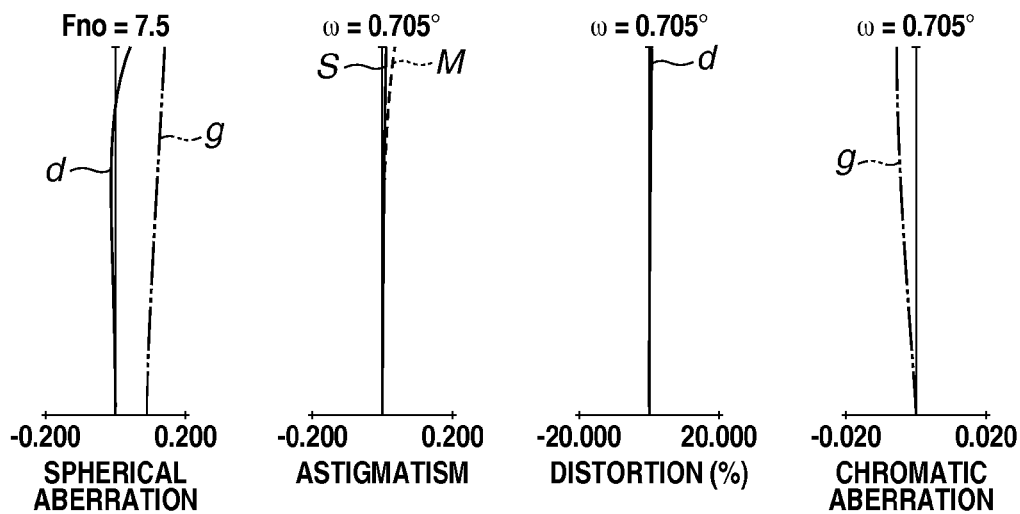

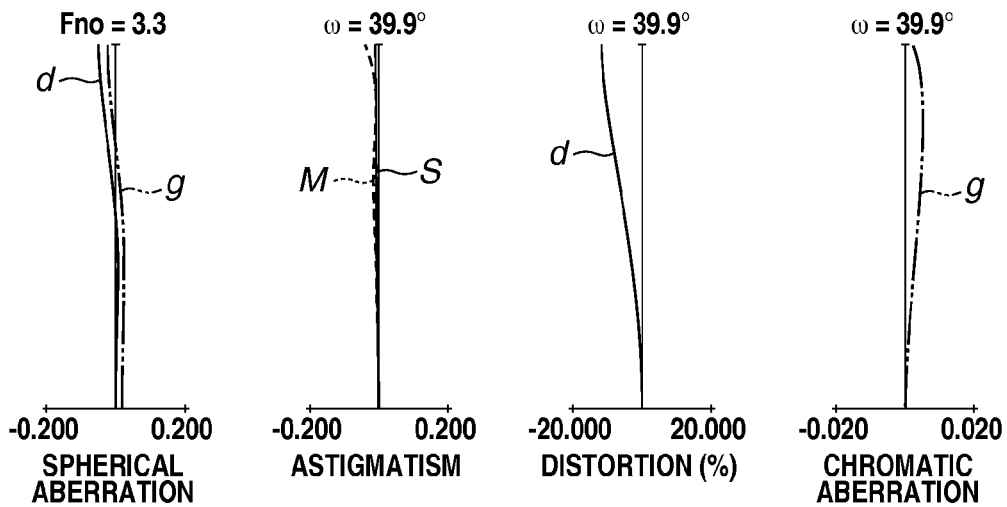
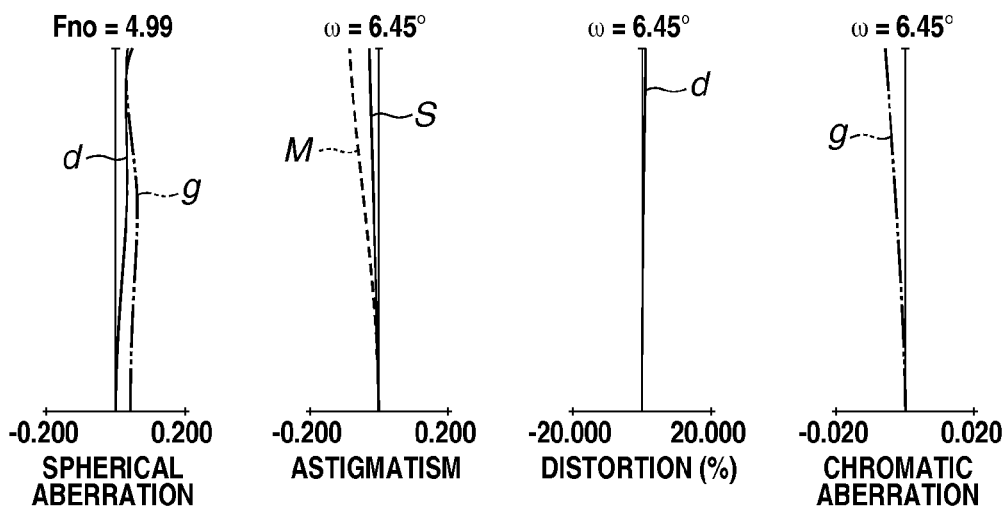
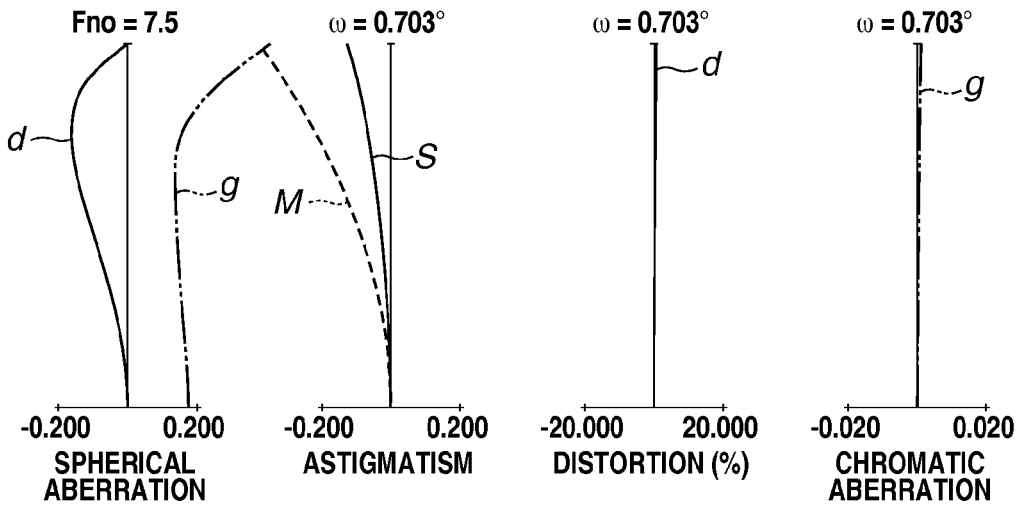

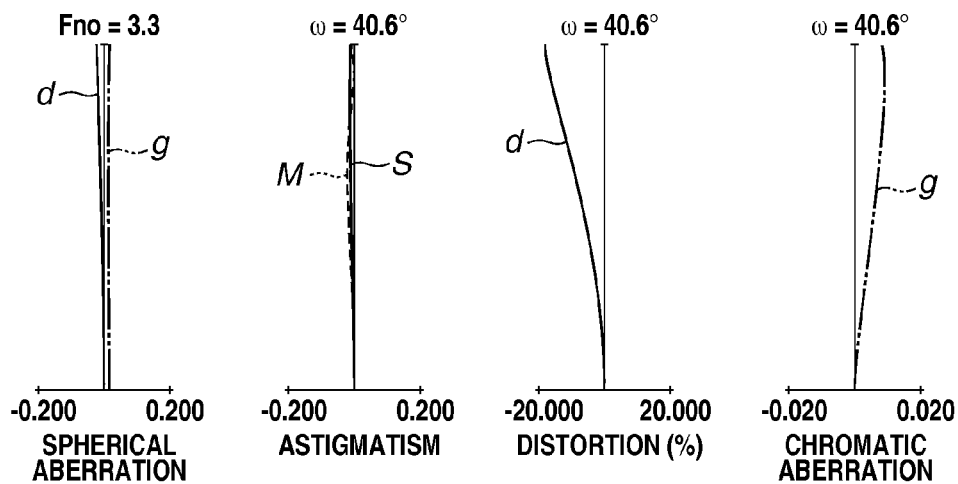
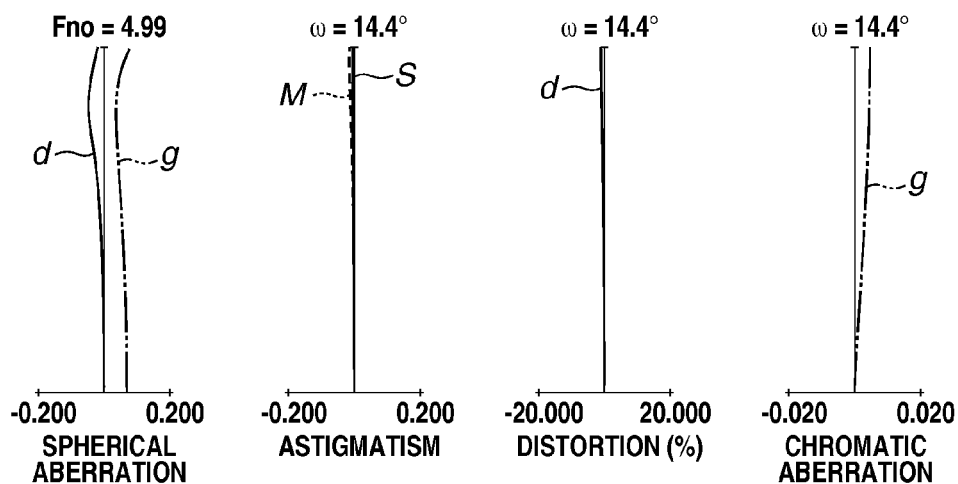
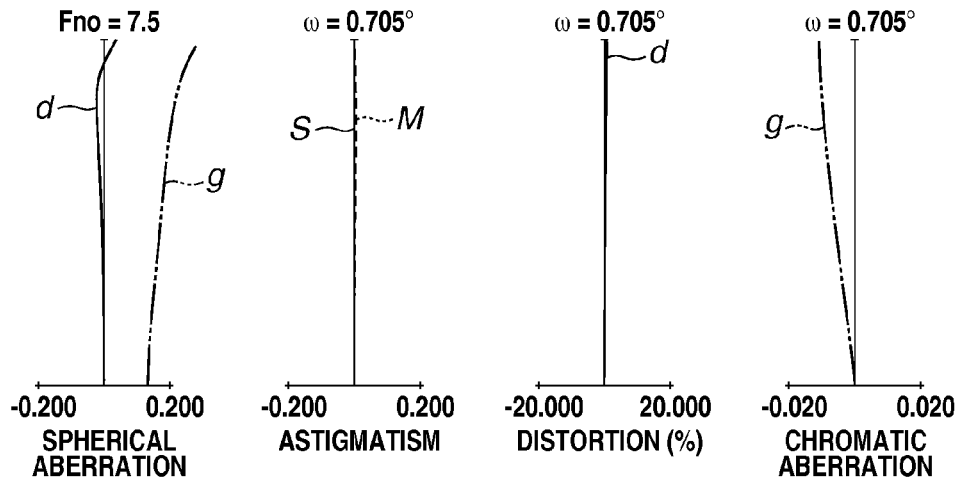

ZOOM LENS AND IMAGING APPARATUS INCLUDING THE SAME

BACKGROUND OF THE INVENTION

1. Field of the Invention

The present invention relates to a zoom lens and an imaging apparatus including the same, and is suitable for an imaging apparatus using an image sensor, such as a digital still camera, a video camera, a monitoring camera, or a broadcasting camera, or an imaging apparatus, such as a camera using a silver-halide film.

2. Description of the Related Art

In recent years, imaging apparatuses, such as digital still cameras and video cameras using a solid-state image sensor, have become highly functional, and the size of these apparatuses has been reduced. Zoom lenses used in these apparatuses are required to have high magnification and a wide viewing angle, to be small, and to have excellent optical performance in all zoom regions. To respond to such demands, a zoom lens including lens units having positive, negative, and positive refractive power in order from an object side to an image side is known.

However, when high magnification of the zoom lens is achieved, since a focal length at a telephoto end becomes long, the axial chromatic aberration is increased. As a configuration to decrease axial chromatic aberration in zoom lenses with long focal length, Japanese Patent Application Laid-Open No. 2011-53297 discusses a zoom lens using anomalous dispersion glass as a material for a positive lens included in a first lens unit.

Generally, to obtain a small photographic optical system with high magnification, the refractive power of the lens units that configure the photographic optical system may just be increased, and the number of lenses that configure each lens unit may just be decreased. However, when the refractive power of the lens unit is increased, the refractive power of each lens surface of a lens that configures the lens unit is increased, and the thickness of the lens is increased to secure the edge thickness of the lens. As a result, a front lens diameter (front lens effective diameter) becomes large, and it becomes difficult to reduce the overall size of the optical system. Further, the chromatic aberration increases because the focal length at the telephoto end becomes long, and it becomes difficult to correct the chromatic aberration.

SUMMARY OF THE INVENTION

According to an aspect of the present invention, a zoom lens includes, in order from an object side to an image side, a first lens unit having positive refractive power, a second lens unit having negative refractive power, a third lens unit having positive refractive power, and a rear lens group including one or more additional lens units, wherein an interval between adjacent lens units is changed in zooming, wherein the first lens unit is positioned closer to the object side at a telephoto end than at a wide-angle end, the first lens unit includes at least four lenses, the first lens unit includes one or more positive lenses using a material that satisfies a conditional expression of $85.0 < vd1P < 100.0$ where an Abbe number of materials of positive lenses included in the first lens unit is $vd1P$, and a conditional expression of $5.0 < M1/fW < 40.0$ is satisfied where a focal length of the zoom lens at the wide-angle end is $fW$, and an amount of movement of the first lens unit on an optical axis in zooming from a wide-angle end to a telephoto end is $M1$.

Further features of the present invention will become apparent from the following description of exemplary embodiments with reference to the attached drawings.

BRIEF DESCRIPTION OF THE DRAWINGS

FIGS. 2A, 2B to 2C are aberration diagrams of the zoom lens at the wide-angle end, a middle zoom position, and a telephoto end, respectively, according to the first exemplary embodiment.

FIGS. 4A, 4B to 4C are aberration diagrams of the zoom lens at the wide-angle end, a middle zoom position, and a telephoto end, respectively, according to the second exemplary embodiment.

FIGS. 8A, 8B to 8C are aberration diagrams of the zoom lens at the wide-angle end, a middle zoom position, and a telephoto end, respectively, according to the fourth exemplary embodiment.

DESCRIPTION OF THE EMBODIMENTS

A zoom lens and an imaging apparatus including the zoom lens according to an exemplary embodiment of the present invention will be described below in detail with reference to the appended drawings. The zoom lens according to an exemplary embodiment of the present invention comprises, in order from an object side to an image side, a first lens unit having positive refractive power, a second lens unit having negative refractive power, a third lens unit having positive refractive power, and a rear group including one or more lens units. In the present exemplary embodiment, the lens units may include one or more lenses.

Figure 1:
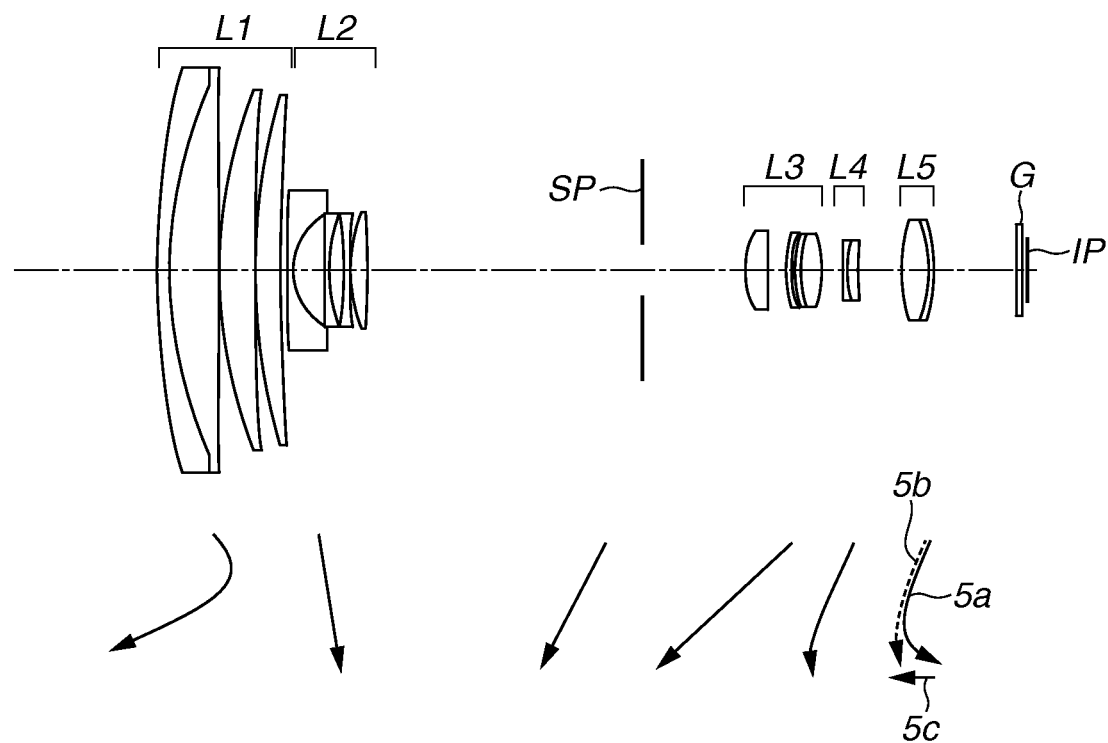
FIG. 1 is a lens cross-sectional view of a zoom lens at a wide-angle end according to a first exemplary embodiment.
Figure 3:
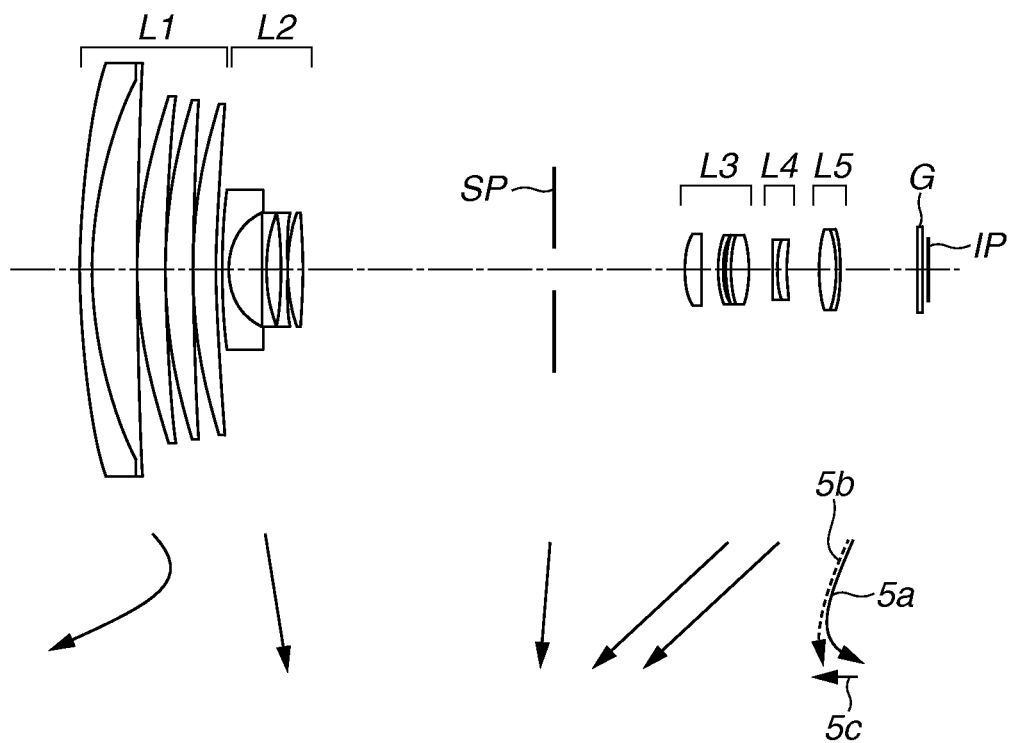
FIG. 3 is a lens cross-sectional view of a zoom lens at a wide-angle end according to a second exemplary embodiment.

FIG. 1 is a lens cross-sectional view of a zoom lens according to a first exemplary embodiment at a wide-angle end. FIGS. 2A to 2C are aberration diagrams of the zoom lens according to the first exemplary embodiment at the wide-angle end, a middle zoom position, and a telephoto end, respectively. The first exemplary embodiment illustrates a zoom lens having a zoom ratio of 84.94 and an aperture ratio of about 3.30 to 7.50. FIG. 3 is a lens cross-sectional view of a zoom lens according to a second exemplary embodiment at a wide-angle end. FIG. 4A to 4C are aberration diagrams of the zoom lens according to the second exemplary embodiment at the wide-angle end, a middle zoom position, and a telephoto end, respectively. The second exemplary embodiment illustrates a zoom lens having a zoom ratio of 82.93 and an aperture ratio of about 3.30 to 7.50.

Figure 5:
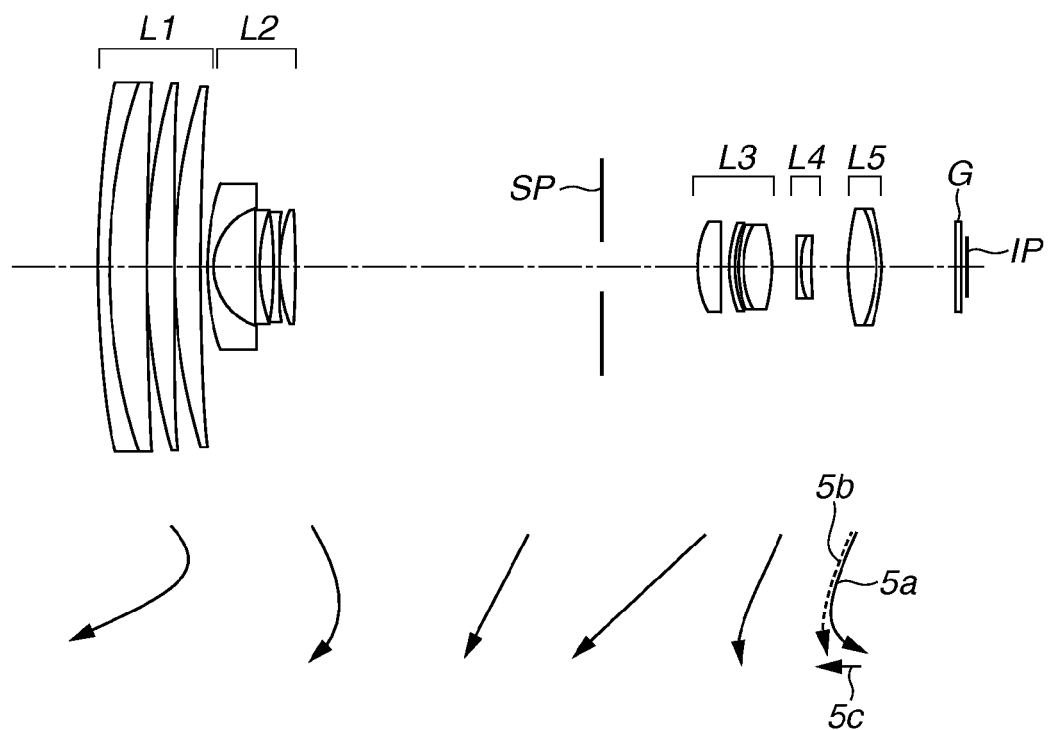
FIG. 5 is a lens cross-sectional view of a zoom lens at a wide-angle end according to a third exemplary embodiment.
Figure 6A:
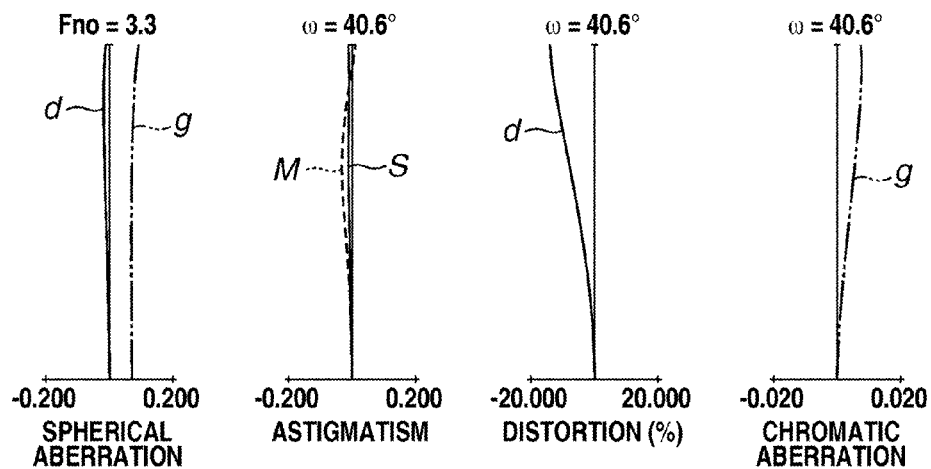
FIGS. 6A, 6B to 6C are aberration diagrams of the zoom lens at the wide-angle end, a middle zoom position, and a telephoto end, respectively, according to the third exemplary embodiment.
Figure 6B:
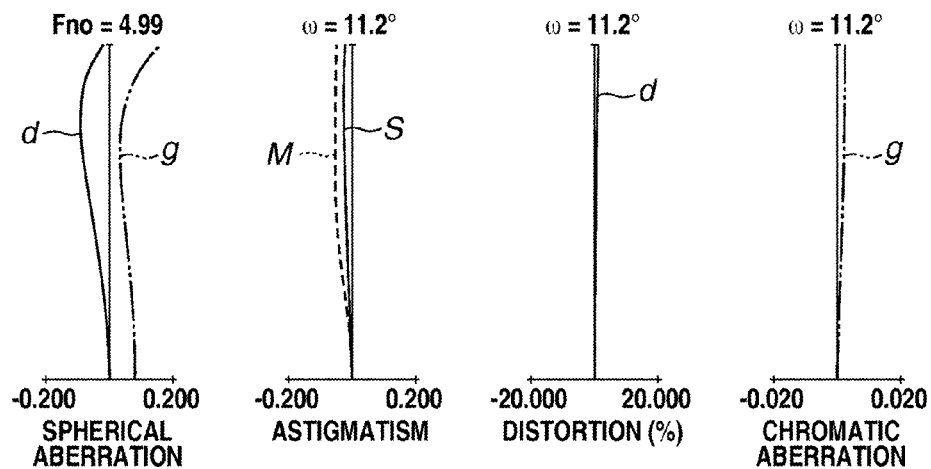
Figure 6C:
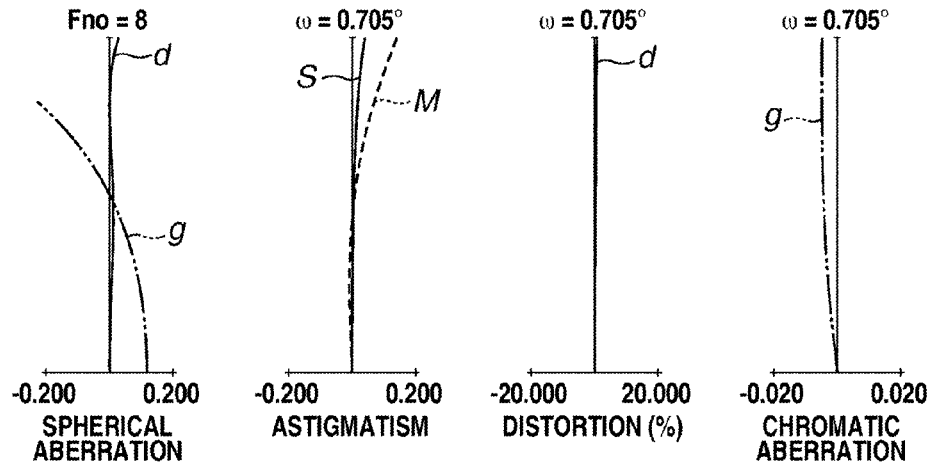
Figure 7:
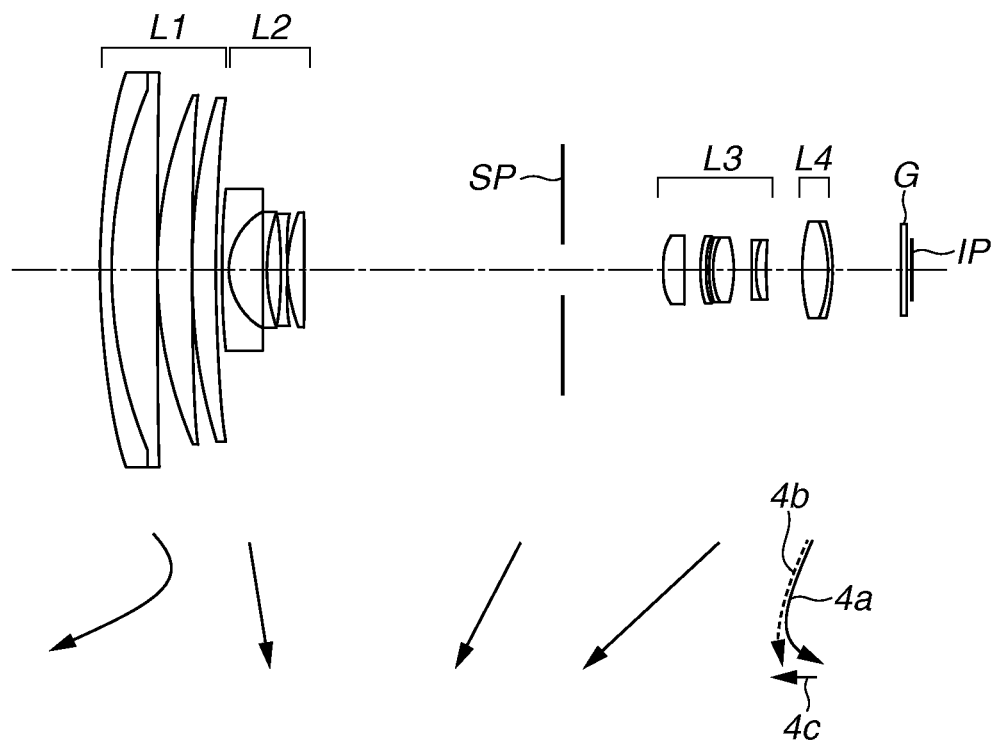
FIG. 7 is a lens cross-sectional view of a zoom lens at a wide-angle end according to a fourth exemplary embodiment.

FIG. 5 is a lens cross-sectional view of a zoom lens at a wide-angle end according to a third exemplary embodiment. FIGS. 6A to 6C are aberration diagrams of the zoom lens according to the third exemplary embodiment at the wide-angle end, a middle zoom position, and a telephoto end, respectively. The third exemplary embodiment illustrates a zoom lens having a zoom ratio of 84.99 and an aperture ratio of about 3.30 to 8.00. FIG. 7 is a lens cross-sectional view of a zoom lens at a wide-angle end according to a fourth exemplary embodiment. FIGS. 8A to 8C are aberration diagrams of the zoom lens according to the fourth exemplary embodiment at the wide-angle end, a middle zoom position, and a telephoto end, respectively. The fourth exemplary embodiment illustrates a zoom lens having a zoom ratio of 84.95 and an aperture ratio of about 3.30 to 7.50.

Figure 9:
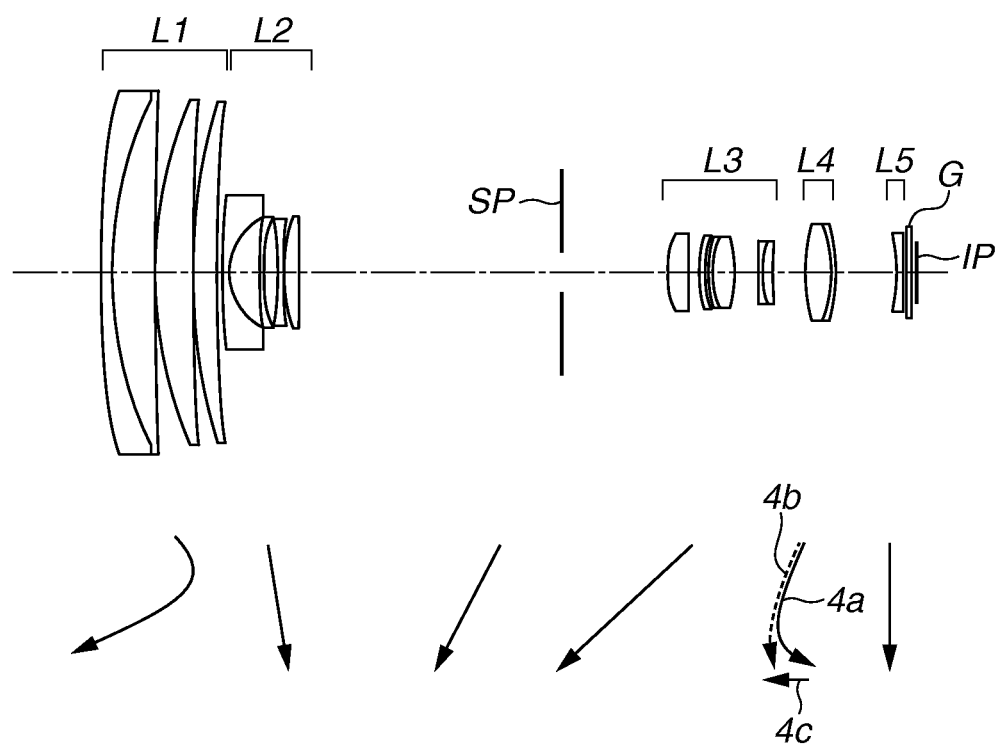
FIG. 9 is a lens cross-sectional view of a zoom lens at a wide-angle end according to a fifth exemplary embodiment.
Figure 10A:
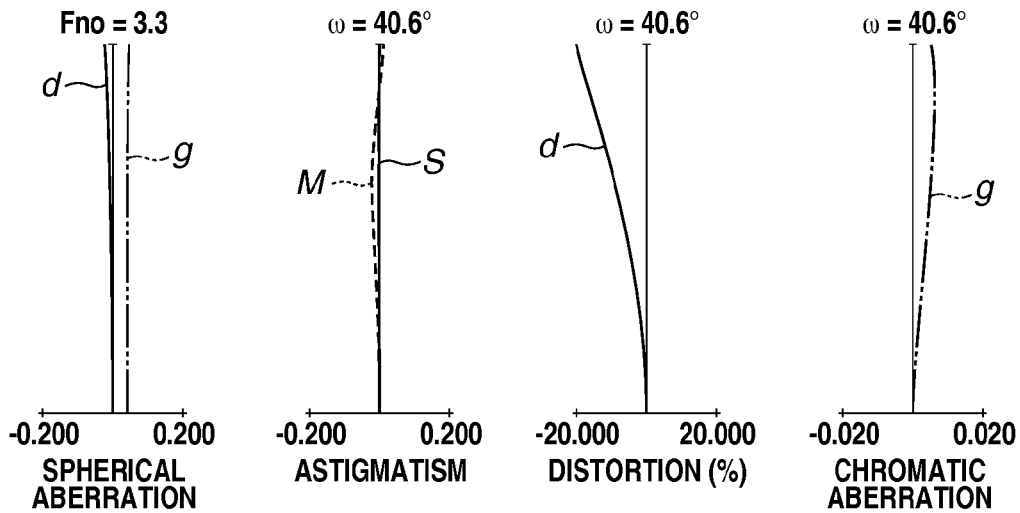
FIGS. 10A, 10B, and 10C are aberration diagrams of the zoom lens at the wide-angle end, a middle zoom position, and a telephoto end, respectively, according to the fifth exemplary embodiment.
Figure 10B:
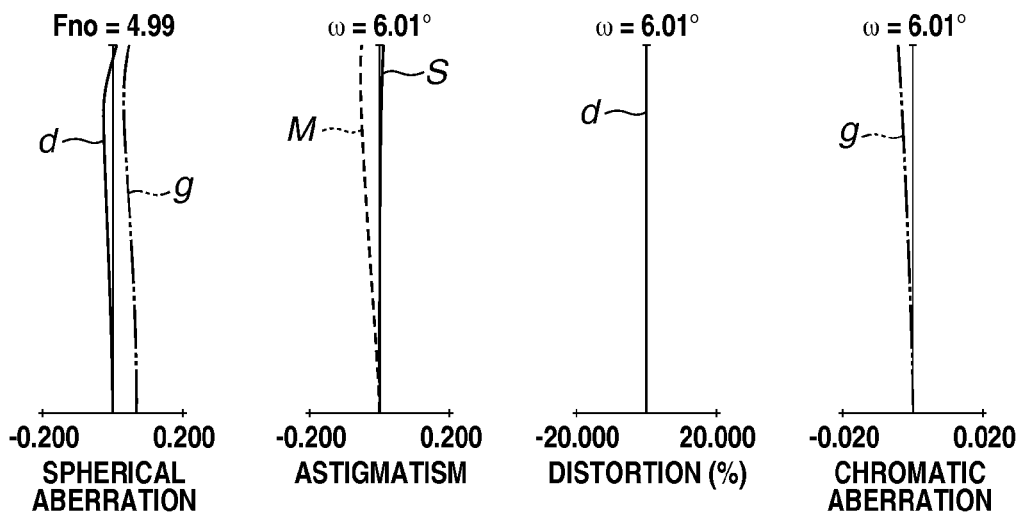
Figure 10C:
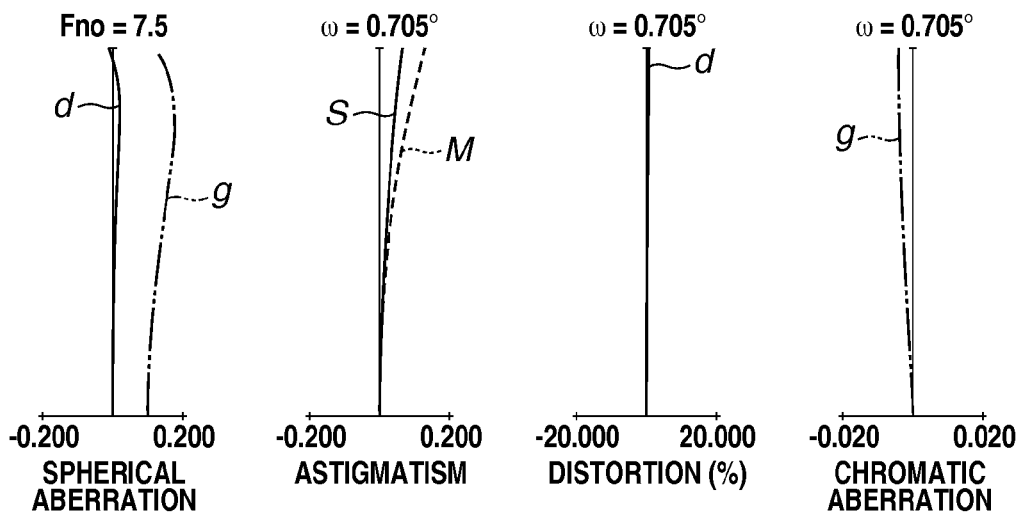
Figure 11:
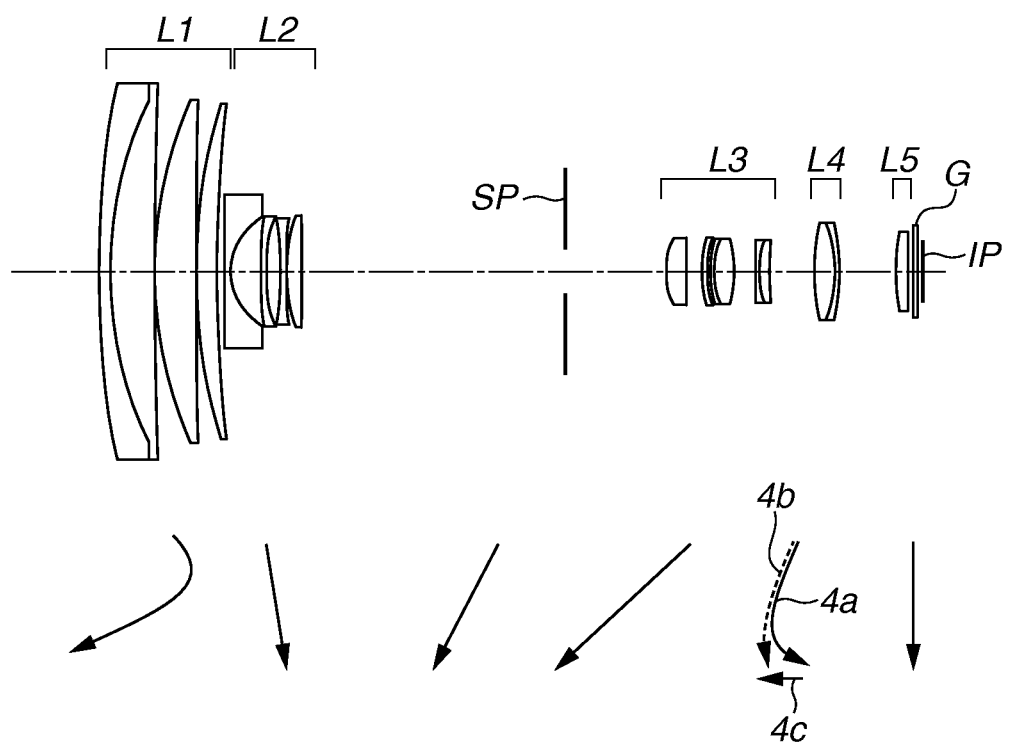
FIG. 11 is a lens cross-sectional view of a zoom lens at a wide-angle end, according to a sixth exemplary embodiment.
Figure 12A:
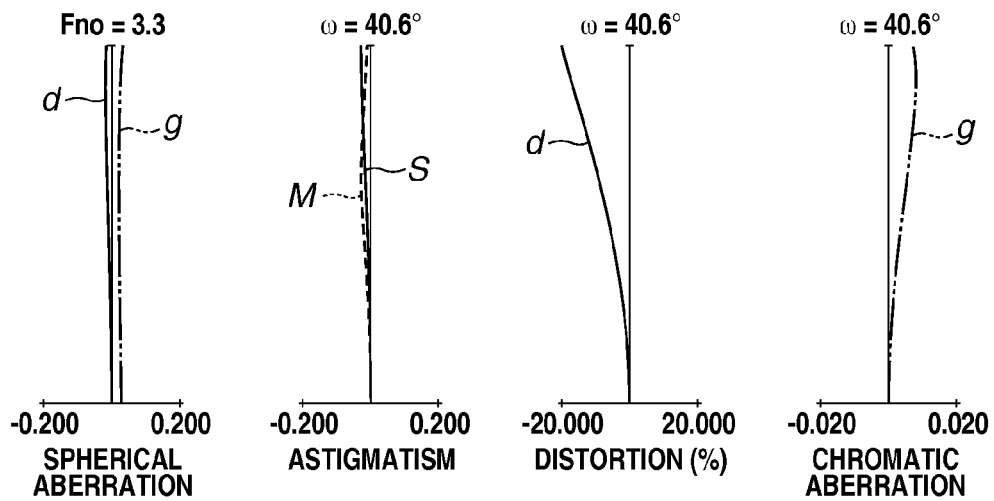
FIGS. 12A, 12B, and 12C are aberration diagrams of the zoom lens at the wide-angle end, a middle zoom position, and a telephoto end, respectively, according to the sixth exemplary embodiment.
Figure 12B:
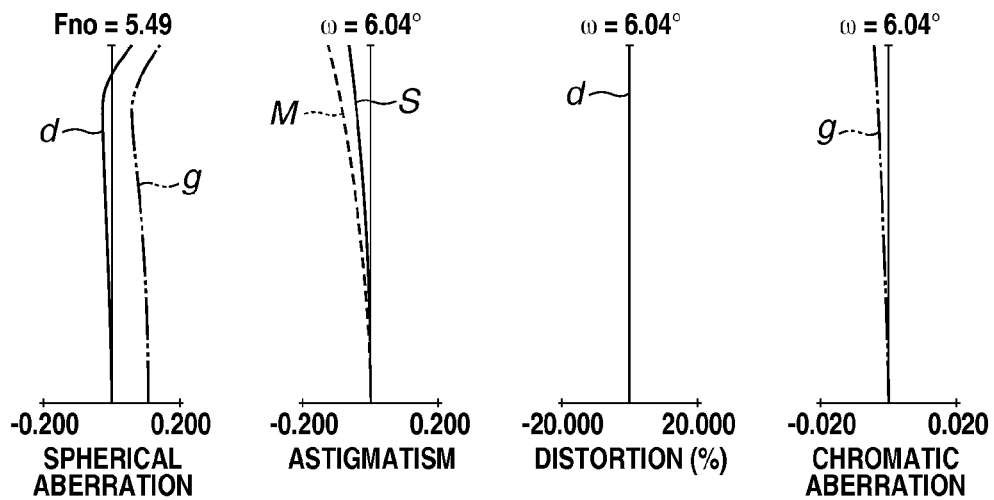
Figure 12C:
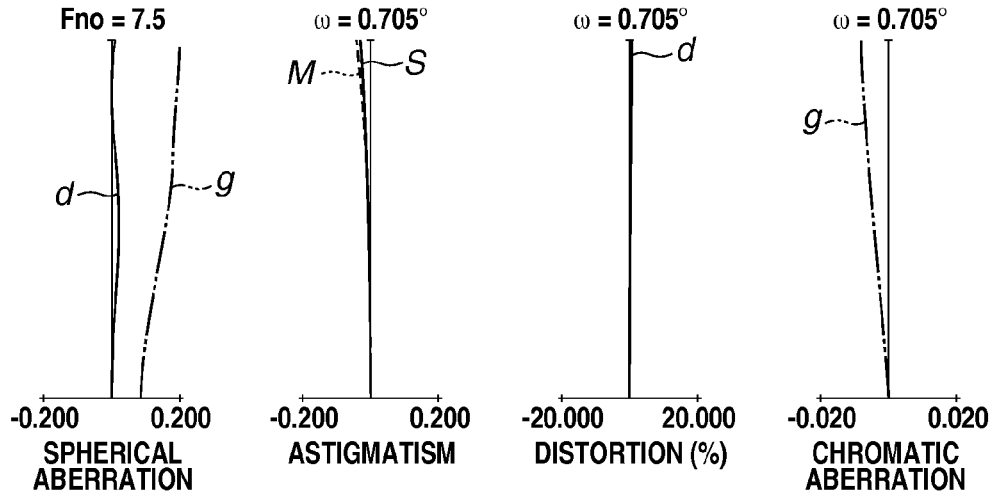

FIG. 9 is a lens cross-sectional view of a zoom lens at a wide-angle end according to a fifth exemplary embodiment. FIGS. 10A to 10C are aberration diagrams of the zoom lens according to the fifth exemplary embodiment at the wide-angle end, a middle zoom position, and a telephoto end, respectively. The fifth exemplary embodiment illustrates a zoom lens having a zoom ratio of 84.94 and an aperture ratio of about 3.30 to 7.50. FIG. 11 is a lens cross-sectional view of a zoom lens at a wide-angle end according to a sixth exemplary embodiment. FIGS. 12A to 12C are aberration diagrams of the zoom lens of the sixth exemplary embodiment at the wide-angle end, a middle zoom position, and a telephoto end, respectively. The sixth exemplary embodiment illustrates a zoom lens having a zoom ratio of 85.05 and an aperture ratio of about 3.30 to 7.50.

Figure 13:
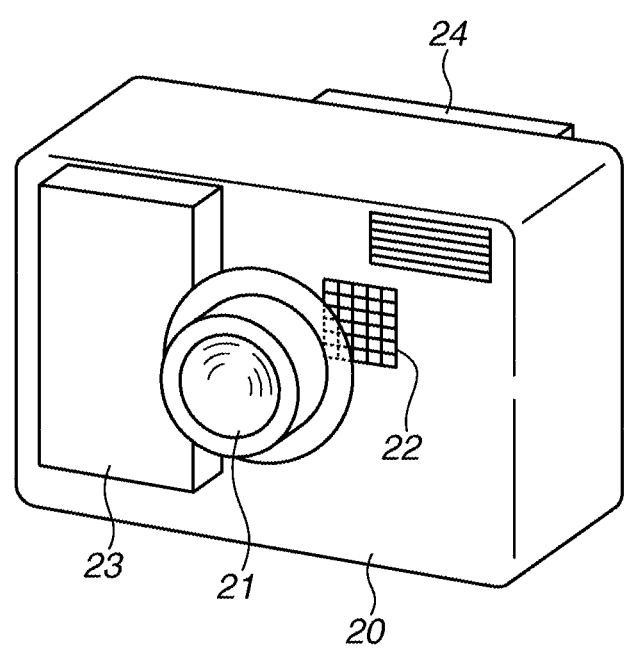
FIG. 13 is a schematic diagram of an imaging apparatus according to an exemplary embodiment of the present invention.
Figure 14:
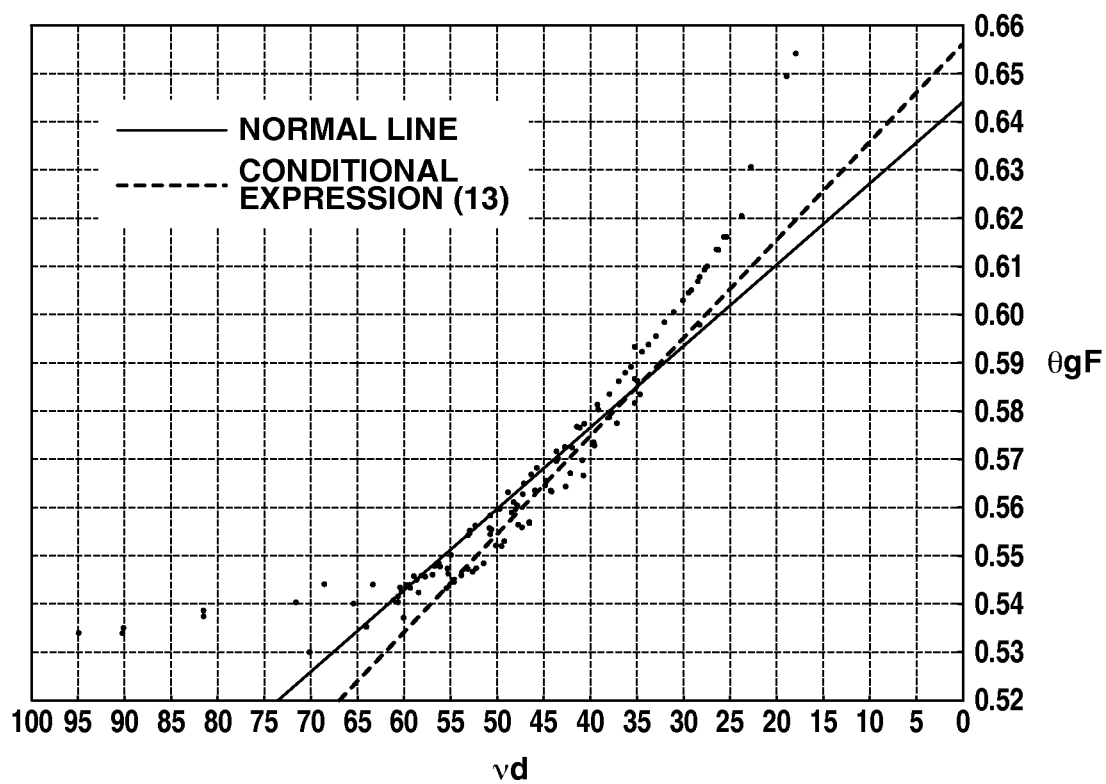
FIG. 14 is a diagram illustrating the relationship between the partial dispersion ratio and Abbe number $\theta gF$-$vd$ of conventional glass material, and exemplary materials used in the zoom lens according to the various embodiments disclosed herein.

FIG. 13 is a principal part schematic diagram of a digital still camera (imaging apparatus) including a zoom lens of an exemplary embodiment of the present invention. Each of the zoom lenses of the exemplary embodiments is an imaging lens system used for an imaging apparatus, such as a video camera, a digital still camera, a silver-halide film camera, or a television camera. In the lens cross-sectional view, a left side is the object side (front side) and a right side is the image side (rear side). Further, in the lens cross-sectional view, Li is the i-th lens unit where i is an order of a lens unit from the object side to the image side. FIG. 14 is a θgF-vd diagram.

The zoom lenses of the first to third exemplary embodiments include, in order from the object side to the image side, a first lens unit L1 having positive refractive power, a second lens unit L2 having negative refractive power, a third lens unit L3 having positive refractive power, a fourth lens unit L4 having negative refractive power, and a fifth lens unit L5 having positive refractive power. The first to third exemplary embodiments are positive-lead type five-unit zoom lenses including five lens units, and rear groups includes the fourth lens unit L4 having negative refractive power and the fifth lens unit L5 having positive refractive power.

The zoom lens according to the fourth exemplary embodiment includes, in order from the object side to the image side, a first lens unit L1 having positive refractive power, a second lens unit L2 having negative refractive power, a third lens unit L3 having positive refractive power, and a fourth lens unit L4 having positive refractive power. The fourth exemplary embodiment is a positive-lead type four-unit zoom lens including four lens units, and a rear group includes the fourth lens unit L4 having positive refractive power.

The zoom lens according to the fifth exemplary embodiment includes, in order from the object side to the image side, a first lens unit L1 having positive refractive power, a second lens unit L2 having negative refractive power, a third lens unit L3 having positive refractive power, a fourth lens unit L4 having positive refractive power, and a fifth lens unit L5 having negative refractive power. The fifth exemplary embodiment is a positive-lead type five-unit zoom lens including five lens units, and a rear group includes the fourth lens unit L4 having positive refractive power and the fifth lens unit L5 having negative refractive power.

The zoom lens according to the sixth exemplary embodiment includes, in order from the object side to the image side, a first lens unit L1 having positive refractive power, a second lens unit L2 having negative refractive power, a third lens unit L3 having positive refractive power, a fourth lens unit L4 having positive refractive power, and a fifth lens unit L5 having positive refractive power. The sixth exemplary embodiment is a positive-lead type five-unit zoom lens including five lens units, and a rear group includes the fourth lens unit L4 having positive refractive power and the fifth lens unit L5 having positive refractive power.

In each of the exemplary embodiments, an aperture stop SP is arranged between the second lens unit L2 and the third lens unit L3. In zooming from the wide-angle end to the telephoto end, the aperture stop SP is moved with a locus, which is different from the lens units, to be positioned at the object side at the telephoto end than at the wide-angle end. Accordingly, an entrance pupil position can be moved to the object side, whereby downsizing of a front lens effective diameter can be achieved.

An optical block G corresponds to an optical filter, a face plate, a low-pass filter, an infrared cut filter, and the like. The zoom lens further includes an image plane IP. When the zoom lens is used as an imaging optical system of a video camera or a digital camera, the image plane IP corresponds to a solid-state image sensor (photoelectric conversion element), such as a charge-coupled device (CCD) sensor or a complementary metal-oxide semiconductor (CMOS) sensor. When the zoom lens is used as an image optical system of a silver-halide film camera, the image plane IP corresponds to a film surface.

In the spherical aberration diagram, Fno is an F-number, and indicates a spherical aberration with respect to a d line (wavelength 587.6 nm) and a g line (wavelength 435.8 nm). In the astigmatism diagram, S is a sagittal image plane, and M is a meridional image plane. The distortion diagram illustrates distortion of the d line. The lateral chromatic aberration diagram illustrates a lateral chromatic aberration in the g line. ω is an imaging half angle of view.

In each of the exemplary embodiments, as illustrated by the arrows in the lens cross-sectional view, the lens units are moved in zooming from the wide-angle end to the telephoto end, and intervals between adjacent lens units are changed.

More specifically, in each of the exemplary embodiments, in zooming from the wide-angle end to the telephoto end, the first lens unit L1 is moved to draw a convex locus toward the image side, and is positioned closer to the object (object side) at the telephoto end than at the wide-angle end. Accordingly, the total lens length at the wide-angle end is shortened, and high magnification can be realized.

In the first, second, fourth, fifth, and sixth exemplary embodiments, the second lens unit L2 is moved to be positioned closer to the image plane (image side) at the telephoto end than at the wide-angle end. In the third exemplary embodiment, the second lens unit L2 is moved to draw a convex locus toward the image side in zooming from the wide-angle end to the telephoto end. In each of the exemplary embodiments, the third lens unit L3 is moved to be positioned closer to the object at the telephoto end than at the wide-angle end.

In the first to third exemplary embodiments, the fourth lens unit L4 is moved to be positioned closer to the object at the telephoto end than at the wide-angle end. In the fourth to sixth exemplary embodiments, the fourth lens unit L4 is moved to draw a convex locus toward the object side in zooming from the wide-angle end to the telephoto end. In the first to third exemplary embodiments, the fifth lens unit L5 is moved to draw a convex locus toward the object side in zooming from the wide-angle end to the telephoto end. In the fifth and sixth exemplary embodiments, the fifth lens unit L5 is not moved in zooming.

Further, in the first to third exemplary embodiments, the fifth lens unit L5 is used as a focus lens unit. When focusing is performed from an infinite-distance object to a near-distance object at the telephoto end, the fifth lens unit L5 is moved out to the object side as illustrated by the arrow 5c of the lens cross section. The solid line 5a and the dotted line 5b in the lens cross-sectional view respectively illustrate moving loci for correcting image plane variation associated with the zooming from the wide-angle end to the telephoto end when focusing is performed with respect to the infinite-distance object and to the near-distance object.

In the fourth to sixth exemplary embodiments, the fourth lens unit L4 is used as a focus lens unit. When focusing is performed from an infinite-distance object to a near-distance object at the telephoto end, the fourth lens unit L4 is moved out to the object side as illustrated by the arrow 4c in the lens cross section. The solid line 4a and the dotted line 4b in the lens cross-sectional view respectively illustrate moving loci for correcting image plane variation associated with the zooming from the wide-angle end to the telephoto end when focusing is performed with respect to the infinite-distance object and to the near-distance object.

In each of the exemplary embodiments, the aperture stop SP is moved to draw a locus different from loci drawn by the lens units, so that the interval between the second lens unit L2 and the third lens unit L3 at the telephoto end can be made shorter. Accordingly, the total length of the lens (total lens length) at the telephoto end can be shortened.

In each of the exemplary embodiments, a decrease in a chromatic aberration is achieved using a lens made of a material having anomalous dispersion. Hereinafter, a method for decreasing a chromatic aberration using a material having anomalous dispersion will be described.

FIG. 14 is a graph in which a vertical axis represents relative partial dispersion θgF that takes a larger value in an up direction and a horizontal axis represents an Abbe number that takes a larger value in a left direction (hereinafter, referred to as "θgF-vd diagram") in typical optical glass. It is known that, when materials are mapped on the θgF-vd diagram, the materials are distributed along a straight line called normal line. In an exemplary embodiment of the present invention, the normal line is expressed by an expression of:

$$\theta gF = -0.001682 \times vd + 0.6438$$

where the Abbe number vd and the relative partial dispersion θgF are numerical values respectively expressed by:

$$vd = (Nd-1)/(NF-NC)$$

$$\theta gF = (Ng-NF)/(NF-NC)$$

where refractive indexes with respect to the Fraunhofer g line (wavelength 435.8 nm), the F line (486.1 nm), the C line (656.3 nm), and the d line (587.6 nm) are Ng, NF, NC, and Nd, respectively.

In a positive-lead type zoom lens having a long focal length, a marginal ray in an on-axis light flux passes through a highest position in the first lens unit L1. Therefore, an axial chromatic aberration or a spherical aberration is more likely to be generated in the first lens unit L1. When correction of the spherical aberration in a plurality of wavelengths is performed at the telephoto end, the axial chromatic aberration becomes larger, and thus it is favorable that a secondary spectrum of the axial chromatic aberration is as small as possible.

To decrease the secondary spectrum of the axial chromatic aberration in the first lens unit L1, it is necessary to make an inclination (or slope) of a straight line connecting lens materials of the positive lens and of the negative lens that configure the first lens unit L1 small in the θgF-vd diagram (see FIG. 14).

For example, it is preferable to use, for the positive lens included in the first lens unit L1, a material like fluorite having a large Abbe number vd and existing in a region away from the normal line in a direction where the relative partial dispersion θgF becomes larger in the θgF-vd diagram. Further, it is preferable to use, for the negative lens included in the first lens unit L1, a material like a lanthanum-based lens material existing in a region away from the normal line in a direction where the relative partial dispersion θgF becomes smaller in the θgF-vd diagram.

With a combination of the materials, the inclination of the straight line connecting the lens materials that configure the positive lens and the negative lens included in the first lens unit L1 becomes smaller than that of the normal line, and the secondary spectrum of the axial chromatic aberration can be favorably corrected. By optimizing the materials of the lenses included in the first lens unit L1 in this way, the secondary spectrum of the axial chromatic aberration can be favorably corrected.

In each of the exemplary embodiments, the first lens unit L1 includes one or more positive lenses using a material that satisfies the following conditional expression:

$$85.0 < vd1P < 100.0 \tag{1}$$

where the Abbe number of materials of positive lenses included in the first lens unit L1 is vd1P.

Further, it is preferable that the positive lens using the material that satisfies the conditional expression (1) satisfies the conditional expression:

$$0.520 < \theta gF1P < 0.580 \tag{2}$$

where the relative partial dispersion of the materials of the positive lenses included in the first lens unit L1 is θgF1P.

In the first and third exemplary embodiments, materials of the first, second, and third positive lenses counted from the object side among the positive lenses included in the first lens unit L1 are the material that satisfies the conditional expressions (1) and (2). In the second exemplary embodiment, materials of the first, second, third, and fourth positive lenses counted from the object side among the positive lenses included in the first lens unit L1 are the material that satisfies the conditional expressions (1) and (2). In the fourth to sixth exemplary embodiments, a material of the second positive lens counted from the object side among the positive lenses included in the first lens unit L1 is the material that satisfies the conditional expressions (1) and (2).

If the Abbe number vd1P of the materials of the positive lenses included in the first lens unit L1 becomes larger than a maximum value of the conditional expression (1), actually existing materials are limited, and thus it is not favorable.

If the Abbe number vd1P of the materials of the positive lenses included in the first lens unit L1 becomes smaller than a minimum value of the conditional expression (1), mainly, it becomes difficult to sufficiently correct the axial chromatic aberration at the telephoto end, and thus it is not favorable.

If the relative partial dispersion θgF1P of the materials of the positive lenses included in the first lens unit L1 becomes smaller than a minimum value of the conditional expression (2), the secondary spectrum of the axial chromatic aberration at the telephoto end is increased, and thus it is not favorable.

If the relative partial dispersion θgF1P of the materials of the positive lenses included in the first lens unit L1 becomes larger than a maximum value of the conditional expression (2), materials actually existing in a region where the conditional expression (1) is satisfied are limited, and thus it is not favorable.

Further, each of the exemplary embodiments satisfies the conditional expression of:

$$5.0 < M1/fW < 40.0 \quad (3)$$

where a focal length of the entire zoom lens at the wide-angle end is fW, and an amount of movement of the first lens unit L1 on an optical axis in zooming from the wide-angle end to the telephoto end is M1.

In the present exemplary embodiment, the amount of movement is a difference of positions on the optical axis of each lens unit at the wide-angle end and at the telephoto end, and the sign of the amount of movement is positive when the lens unit is positioned closer to the object at the telephoto end than at the wide-angle end, and is negative when the lens unit is positioned closer to the image plane.

If the amount of movement M1 of the first lens unit L1 becomes larger than a maximum value of the conditional expression (3), the total lens length at the telephoto end is increased, and thus it is not favorable.

If the amount of movement M1 of the first lens unit L1 becomes smaller than a minimum value of the conditional expression (3), it becomes necessary to make the refractive power of the first lens unit L1 stronger to realize high magnification. As a result, it becomes difficult to sufficiently correct a spherical aberration and a coma aberration, and thus it is not favorable.

In each of the exemplary embodiments, the elements are appropriately set to satisfy the conditional expressions (1) and (3). Accordingly, a small zoom lens having high magnification and a wide viewing angle with favorably corrected chromatic aberration can be obtained. Further, in each of the exemplary embodiments, it is preferable to appropriately set the elements to satisfy the conditional expression (2).

Note that, in each of the exemplary embodiments, favorably, numerical ranges of the conditional expressions (1) to (3) are set as follows:

$$85.0 < vd1P < 97.0 \quad (1a)$$

$$0.525 < \theta gF1P < 0.560 \quad (2a)$$

$$6.0 < M1/fW < 35.0 \quad (3a)$$

More favorably, the numerical ranges of the conditional expressions (1) to (3) are set as follows:

$$85.1 < vd1P < 96.0 \quad (1b)$$

$$0.530 < \theta gF1P < 0.540 \quad (2b)$$

$$8.0 < M1/fW < 30.0 \quad (3b)$$

Further, in each of the exemplary embodiments, it is more favorable to satisfy one or more of following conditional expressions:

$$10.0 < DW/DT < 100.0 \quad (4)$$

$$15.0 < f1/fW < 40.0 \quad (5)$$

$$2.0 < fT/f1 < 6.0 \quad (6)$$

$$7.0 < f1/|f2| < 20.0 \quad (7)$$

$$3.0 < f1/f3 < 10.0 \quad (8)$$

$$0.010 < |f2|/fT < 0.0390 \quad (9)$$

$$-1.00 < (R1-R2)/(R1+R2) < 0.00 \quad (10)$$

$$0.520 < \theta gF1N < 0.750 \quad (11)$$

$$35.0 < vd1N < 50.0 \quad (12)$$

$$\theta gF1N < -0.00203 \times vd1N + 0.656 \quad (13)$$

$$1.75 < nd1N < 2.10 \quad (14)$$

where the focal length of the first lens unit L1 is f1, a focal length of the second lens unit L2 is f2, a focal length of the third lens unit L3 is f3, a focal length of the entire zoom lens (combined focal length of all optical units in the zoom lens) at the telephoto end is fT, and an interval (air space distance) between the aperture stop SP and the third lens unit L3 on the optical axis at the wide-angle end is DW. Further, an interval between the aperture stop SP and the third lens unit L3 on the optical axis at the telephoto end is DT, a curvature radius of an object-side lens surface of a positive lens arranged in the first lens unit L1 is R1, and a curvature radius of an image-side lens surface of the same positive lens is R2, and further, the relative partial dispersion of a material of a negative lens arranged in the first lens unit L1 is θgF1N, the Abbe number is vd1N, and the refractive index is nd1N.

If the interval DW between the aperture stop SP and the third lens unit L3 on the optical axis at the wide-angle end becomes larger than a maximum value of the conditional expression (4), an effective diameter of the third lens unit L3 is increased, and thus it is not favorable. If the interval DW between the aperture stop SP and the third lens unit L3 on the optical axis at the wide-angle end becomes smaller than a minimum value of the conditional expression (4), an effective diameter of the first lens unit L1 is increased, and thus it is not favorable.

If the focal length of the first lens unit L1 becomes longer than a maximum value of the conditional expression (5), the refractive power of the first lens unit L1 becomes weak. As a result, it becomes necessary to make the amount of movement of the first lens unit L1 in zooming larger to realize high magnification, and an increase in the total lens length at the telephoto end is incurred. Therefore, it is not favorable.

If the focal length of the first lens unit L1 becomes shorter than a minimum value of the conditional expression (5), the refractive power of the first lens unit L1 becomes stronger. As a result, amounts of spherical aberration and coma aberration are increased, and it becomes difficult to sufficiently correct these aberrations. Therefore, it is not favorable.

If the focal length of the first lens unit L1 becomes shorter than a maximum value of the conditional expression (6), the refractive power of the first lens unit L1 becomes strong. As a result, the spherical aberration and coma aberration are increased, and it becomes difficult to sufficiently correct these aberrations. Therefore, it is not favorable.

If the focal length of the first lens unit L1 becomes longer than a minimum value of the conditional expression (6), the refractive power of the first lens unit L1 becomes weak. As a result, it becomes necessary to make the amount of movement of the first lens unit L1 in zooming large to realize high magnification, and an increase in the total lens length at the telephoto end is incurred. Therefore, it is not favorable.

If the focal length of the second lens unit L2 becomes shorter than a maximum value of the conditional expression (7), the refractive power of the second lens unit L2 becomes strong. As a result, it becomes difficult to sufficiently correct a curvature of field, and thus it is not favorable.

If the focal length of the second lens unit L2 becomes longer than a minimum value of the conditional expression (7), the refractive power of the second lens unit L2 becomes weak. As a result, it becomes difficult to realize high magnification, and thus it is not favorable.

If the focal length of the third lens unit L3 becomes shorter than a maximum value of the conditional expression (8), the refractive power of the third lens unit L3 becomes strong. As a result, it becomes difficult to sufficiently correct the spherical aberration and the coma aberration, and thus it is not favorable.

If the focal length of the third lens unit L3 becomes longer than a minimum value of the conditional expression (8), the refractive power of the third lens unit L3 becomes weak. As a result, it becomes difficult to realize high magnification, and thus it is not favorable.

If the focal length of the second lens unit L2 becomes longer than a maximum value of the conditional expression (9), the refractive power of the second lens unit L2 becomes weak. As a result, it becomes difficult to realize high magnification, and thus it is not favorable.

If the focal length of the second lens unit L2 become shorter than a minimum value of the conditional expression (9), the refractive power of the second lens unit L2 become strong. As a result, it becomes difficult to sufficiently correct the curvature of field, and thus it is not favorable.

If a maximum value of the conditional expression (10) is exceeded, it becomes difficult to sufficiently correct an aberration with respect to an off-axis light flux at the telephoto side, and the curvature of field is increased. Therefore, it is not favorable.

If a minimum value of the conditional expression (10) is exceeded, it becomes difficult to correct the curvature of field at the wide-angle side and to correct the spherical aberration at the telephoto side in a well-balanced manner, and thus it is not favorable.

The conditional expressions (11) to (13) define the relative partial dispersion θgF1N and the Abbe number vd1N of the material of the negative lens arranged in the first lens unit L1. By satisfying the conditional expressions (11) to (13), the secondary spectrum of the axial chromatic aberration can be favorably corrected.

If the refractive index nd1N of the material of the negative lens arranged in the first lens unit L1 becomes larger than a maximum value of the conditional expression (14), materials are limited in a region where the conditional expressions (11) to (13) are satisfied, and thus it is not favorable.

If the refractive index nd1N of the material of the negative lens arranged in the first lens unit L1 becomes smaller than a minimum value of the conditional expression (14), the effective diameter of the first lens unit L1 is increased, and thus it is not favorable.

Further, favorably, effects of the conditional expressions can be increased (improved) if numerical ranges of the conditional expressions (4) to (12) and (14) are set as follows:

$$15.0 < DW/DT < 80.0 \quad (4a)$$

$$18.0 < f1/fW < 37.0 \quad (5a)$$

$$2.3 < fT/f1 < 5.0 \quad (6a)$$

$$8.0 < f1/|f2| < 17.0 \quad (7a)$$

$$3.5 < f1/f3 < 9.0 \quad (8a)$$

$$0.015 < |f2|/fT < 0.029 \quad (9a)$$

$$-0.98 < (R1-R2)/(R1+R2) < -0.30 \quad (10a)$$

$$0.540 < \theta gF1N < 0.700 \quad (11a)$$

$$35.0 < vd1N < 45.0 \quad (12a)$$

$$1.80 < nd1N < 2.00 \quad (14a)$$

Further, more favorably, the numerical ranges of the conditional expressions (4) to (12) and (14) are set as follows:

$$16.0 < DW/DT < 60.0 \quad (4b)$$

$$20.0 < f1/fW < 35.0 \quad (5b)$$

$$2.4 < fT/f1 < 4.5 \quad (6b)$$

$$9.0 < f1/|f2| < 15.5 \quad (7b)$$

$$3.9 < f1/f3 < 8.2 \quad (8b)$$

$$0.020 < |f2|/fT < 0.028 \quad (9b)$$

$$-0.95 < (R1-R2)/(R1+R2) < -0.40 \quad (10b)$$

$$0.560 < \theta gF1N < 0.680 \quad (11b)$$

$$35.0 < vd1N < 42.0 \quad (12b)$$

$$1.87 < nd1N < 1.95 \quad (14b)$$

Next, a configuration of the lens units will be described. In the first, third, and sixth exemplary embodiments, the first lens unit L1 includes, in order from the object side to the image side, a cemented lens of a negative lens and a positive lens, a positive lens, and a positive lens. In the second exemplary embodiment, the first lens unit L1 includes, in order from the object side to the image side, a cemented lens of a negative lens and a positive lens, a positive lens, a positive lens, and a positive lens. In an exemplary embodiment of the present invention, four or more lenses are used in the first lens unit L1 to favorably correct a spherical aberration, a coma aberration, and an axial chromatic aberration.

The second lens unit L2 includes, in order from the object side to the image side, a negative lens, a negative lens, a negative lens, and a positive lens. By arranging three negative lenses in succession from the object side, an off-axis light beam can be gently refracted, and downsizing of the front lens effective diameter can be realized.

In the first to third exemplary embodiments, the third lens unit L3 includes, in order from the object side to the image side, a positive lens, a negative lens, and a cemented lens of a negative lens and a positive lens. In the fourth to sixth exemplary embodiments, the third lens unit L3 includes, in order from the object side to the image side, a positive lens, a negative lens, a cemented lens of a negative lens and a positive lens, and a cemented lens of a negative lens and a positive lens. The configuration of arranging, from the object side to the image side, a positive lens, a negative lens, and a cemented lens of a negative lens and a positive lens is a triplet type lens system with one added lens, and is called Tessar type. In each of the exemplary embodiments, by including the Tessar type lens configuration to the third lens unit L3, a Petzval sum can be easily adjusted.

In the first to third exemplary embodiments, the fourth lens unit L4 includes, in order from the object side to the image side, a cemented lens in which a negative lens and a positive lens are cemented. In the fourth to sixth exemplary embodiments, the fourth lens unit L4 includes, in order from the object side to the image side, a cemented lens in which a positive lens and a negative lens are cemented.

In the first to third exemplary embodiments, the fifth lens unit L5 includes, in order from the object side to the image side, a cemented lens in which a positive lens and a negative lens are cemented. In the fifth exemplary embodiment, the fifth lens unit L5 includes a negative lens. In the sixth exemplary embodiment, the fifth lens unit L5 includes a positive lens.

Next, first to sixth numerical examples respectively correspond to the first to sixth exemplary embodiments will be described. In each of the numerical examples, i indicates an order of an optical surface from the object side. ri is a curvature radius of the i-th optical surface (i-th surface), di is an interval between the i-th surface and the (i+1)-th surface, ndi and vdi respectively indicate the refractive index and the Abbe number of a material of the i-th optical member with respect to the d line. Spatial dimensions are given in millimeters (mm).

Further, an aspheric surface shape is expressed by $$x=(h^2/R)/[1+[1-(1+k)(h/R)^2]^{1/2}]+A4h^4+A6h^6+A8h^8$$

where k is an eccentricity, A4, A6, and A8 are aspheric coefficients, displacement in an optical axis direction at a position of a height h from the optical axis is x based on a surface vertex. In addition, R is a paraxial curvature radius. Further, display of "e-Z" means "$10^{-Z}$". In the numerical examples, two surfaces closest to the image plane are surfaces of an optical block, such as an optical filter and a face plate.

In each of the exemplary embodiments, back focus (BF) expresses a distance from a surface closest to the image plane to a paraxial image plane in the lens system by an air-equivalent length. Further, correspondence between the numerical examples and the above-described conditional expressions is illustrated in Table 1.

In the first and third exemplary embodiments, the materials of the first, second, and third positive lenses counted from the object side among the positive lenses included in the first lens unit L1 are the materials that satisfy the conditional expressions (1) and (2), and these three positive lenses use the same material. In the second exemplary embodiment, the materials of the first, second, third, and fourth positive lenses counted from the object side among the positive lenses included in the first lens unit L1 are the materials that satisfy the conditional expressions (1) and (2), and these four positive lenses use the same material. In the fourth to sixth exemplary embodiments, the materials of the second positive lenses counted from the object side among the positive lenses included in the first lens unit L1 are the materials that satisfy the conditional expressions (1) and (2).

The effective image diameter (diameter of an image circle) at the wide-angle end can be smaller than the effective image diameter at the telephoto end. This is because, by stretching an image in image processing, barrel-type distortion that is more likely to be generated at the wide-angle side can be corrected.

[First Numerical Example]

Unit mm

Surface Data

| Surface Number | r | d | nd | vd | θdr |
|---|---|---|---|---|---|
| 1 | 97.047 | 1.45 | 1.88300 | 40.8 | 0.567 |
| 2 | 53.453 | 5.75 | 1.43875 | 94.9 | 0.534 |
| 3 | 1706.344 | 0.05 | | | |
| 4 | 55.398 | 4.25 | 1.43875 | 94.9 | 0.534 |
| 5 | 285.779 | 0.05 | | | |
| 6 | 70.212 | 3.05 | 1.43875 | 94.9 | 0.534 |
| 7 | 257.657 | (Variable) | | | |
| 8 | 297.982 | 0.75 | 1.88300 | 40.8 | |
| 9 | 8.039 | 3.68 | | | |
| 10 | 77.382 | 0.60 | 1.80400 | 46.6 | |
| 11 | 19.994 | 1.79 | | | |
| 12 | −32.164 | 0.60 | 1.91082 | 35.3 | |
| 13 | 53.155 | 0.10 | | | |
| 14 | 20.194 | 1.95 | 1.95906 | 17.5 | |
| 15 | −168.028 | (Variable) | | | |
| 16 (Stop) | ∞ | (Variable) | | | |
| 17* | 11.773 | 2.60 | 1.55332 | 71.7 | |
| 18* | 229.074 | 2.14 | | | |
| 19 | 14.958 | 0.60 | 1.80400 | 46.6 | |
| 20 | 10.906 | 0.42 | | | |
| 21 | 16.740 | 0.60 | 2.00330 | 28.3 | |
| 22 | 10.647 | 2.55 | 1.49700 | 81.5 | |
| 23 | −16.450 | (Variable) | | | |
| 24 | −142.611 | 0.50 | 1.78590 | 44.2 | |
| 25 | 11.000 | 1.10 | 1.69895 | 30.1 | |
| 26 | 28.141 | (Variable) | | | |
| 27 | 21.379 | 3.25 | 1.51823 | 58.9 | |
| 28 | −13.751 | 0.50 | 2.00069 | 25.5 | |
| 29 | −21.144 | (Variable) | | | |
| 30 | ∞ | 0.80 | 1.51633 | 64.1 | |
| 31 | ∞ | 0.50 | | | |
| Image plane | ∞ | | | | |

Aspheric surface data

17th surface

K = −3.07501e+000   A 4 = 1.80616e−004   A 6 = −1.99657e−006

18th surface

K = 0.00000e+000   A 4 = 6.32826e−005   A 6 = −1.53078e−006

-continued

| Unit mm | | | |
|---|---|---|---|
| Various data Zoom ratio 84.94 | | | |
| | Wide angle | Middle | Telephoto |
| Focal length | 3.71 | 35.49 | 315.00 |
| F-number | 3.30 | 4.98 | 7.50 |
| Half angle of view | 40.59 | 6.23 | 0.70 |
| Total lens length | 102.75 | 135.79 | 157.98 |
| BF | 10.71 | 26.23 | 8.03 |
| d 7 | 0.75 | 44.03 | 70.55 |
| d15 | 32.61 | 6.77 | 0.42 |
| d16 | 12.23 | 1.42 | 0.72 |
| d23 | 2.56 | 8.63 | 7.66 |
| d26 | 5.29 | 10.12 | 32.00 |
| d29 | 9.69 | 25.20 | 7.00 |

| Zoom lens unit data | | |
|---|---|---|
| Unit | Start surface | Focal length |
| 1 | 1 | 87.88 |
| 2 | 8 | −7.57 |
| 3 | 17 | 16.10 |
| 4 | 24 | −25.96 |
| 5 | 27 | 27.81 |

[Second Numerical Example]

| Unit mm | | | | | |
|---|---|---|---|---|---|
| Surface Data | | | | | |
| Surface Number | r | d | nd | νd | θdr |
| 1 | 101.242 | 1.45 | 1.88300 | 40.8 | 0.567 |
| 2 | 52.632 | 5.67 | 1.43875 | 94.9 | 0.534 |
| 3 | 374.978 | 0.05 | | | |
| 4 | 60.709 | 3.50 | 1.43875 | 94.9 | 0.534 |
| 5 | 188.403 | 0.05 | | | |
| 6 | 70.616 | 3.25 | 1.43875 | 94.9 | 0.534 |
| 7 | 292.126 | 0.00 | | | |
| 8 | 66.665 | 2.95 | 1.43875 | 94.9 | 0.534 |
| 9 | 194.810 | (Variable) | | | |
| 10 | 121.114 | 0.75 | 1.88300 | 40.8 | |
| 11 | 8.146 | 3.86 | | | |
| 12 | 70.807 | 0.60 | 1.80400 | 46.6 | |
| 13 | 18.799 | 1.91 | | | |
| 14 | −34.232 | 0.60 | 1.91082 | 35.3 | |
| 15 | 62.307 | 0.10 | | | |
| 16 | 20.409 | 1.95 | 1.95906 | 17.5 | |
| 17 | −211.617 | (Variable) | | | |
| 18 (Stop) | ∞ | (Variable) | | | |
| 19* | 11.062 | 2.10 | 1.55332 | 71.7 | |
| 20* | −221.352 | 1.86 | | | |
| 21 | 14.687 | 0.60 | 1.80400 | 46.6 | |
| 22 | 10.710 | 0.51 | | | |
| 23 | 20.607 | 0.60 | 2.00330 | 28.3 | |
| 24 | 12.223 | 2.25 | 1.49700 | 81.5 | |
| 25 | −18.378 | (Variable) | | | |
| 26 | 95.421 | 0.50 | 1.78590 | 44.2 | |
| 27 | 11.000 | 1.15 | 1.69895 | 30.1 | |
| 28 | 16.611 | (Variable) | | | |
| 29 | 20.587 | 2.15 | 1.51823 | 58.9 | |
| 30 | −17.475 | 0.50 | 2.00069 | 25.5 | |
| 31 | −25.570 | (Variable) | | | |
| 32 | ∞ | 0.80 | 1.51633 | 64.1 | |
| 33 | ∞ | 0.50 | | | |
| Image plane | ∞ | | | | |

-continued

| Unit mm | | | |
|---|---|---|---|
| Aspheric surface data | | | |
| 19th surface | | | |
| K = −2.96314e+000 | A 4 = 2.23947e−004 | A 6 = 3.38003e−006 | |
| 20th surface | | | |
| K = 0.00000e+000 | A 4 = 1.01382e−004 | A 6 = 4.61135e−006 | |

| Various data Zoom ratio 82.93 | | | |
|---|---|---|---|
| | Wide angle | Middle | Telephoto |
| Focal length | 3.81 | 34.27 | 315.64 |
| F-number | 3.30 | 4.99 | 7.50 |
| Half angle of view | 39.86 | 6.45 | 0.70 |
| Total lens length | 104.42 | 124.31 | 135.53 |
| BF | 10.50 | 27.91 | 3.13 |
| d 9 | 0.75 | 38.90 | 61.24 |
| d17 | 31.12 | 8.27 | −0.00 |
| d18 | 15.93 | 1.78 | 0.28 |
| d25 | 2.96 | 3.01 | 0.94 |
| d28 | 3.96 | 5.24 | 30.74 |
| d31 | 9.47 | 26.88 | 2.11 |

| Zoom lens unit data | | |
|---|---|---|
| Unit | Start surface | Focal length |
| 1 | 1 | 77.50 |
| 2 | 10 | −8.05 |
| 3 | 19 | 15.82 |
| 4 | 26 | −24.03 |
| 5 | 29 | 27.55 |

[Third Numerical Example]

| Unit mm | | | | | |
|---|---|---|---|---|---|
| Surface Data | | | | | |
| Surface Number | r | d | nd | νd | θdr |
| 1 | 123.261 | 1.45 | 1.88300 | 40.8 | 0.567 |
| 2 | 70.266 | 4.45 | 1.43875 | 94.9 | 0.534 |
| 3 | 323.503 | 0.05 | | | |
| 4 | 85.000 | 3.30 | 1.43875 | 94.9 | 0.534 |
| 5 | 451.917 | 0.05 | | | |
| 6 | 77.578 | 3.25 | 1.43875 | 94.9 | 0.534 |
| 7 | 322.152 | (Variable) | | | |
| 8 | 33.039 | 0.75 | 1.88300 | 40.8 | |
| 9 | 7.648 | 4.96 | | | |
| 10 | 104.620 | 0.60 | 1.80400 | 46.6 | |
| 11 | 24.478 | 1.66 | | | |
| 12 | −32.563 | 0.60 | 1.91082 | 35.3 | |
| 13 | 39.969 | 0.10 | | | |
| 14 | 20.348 | 1.95 | 1.95906 | 17.5 | |
| 15 | −219.764 | (Variable) | | | |
| 16 (Stop) | ∞ | (Variable) | | | |
| 17* | 11.694 | 2.90 | 1.55332 | 71.7 | |
| 18* | 99.313 | 1.02 | | | |
| 19 | 14.578 | 0.60 | 1.80400 | 46.6 | |
| 20 | 11.235 | 0.53 | | | |
| 21 | 16.800 | 0.60 | 2.00330 | 28.3 | |
| 22 | 10.614 | 3.45 | 1.49700 | 81.5 | |
| 23 | −15.621 | (Variable) | | | |
| 24 | 779.306 | 0.50 | 1.78590 | 44.2 | |
| 25 | 11.000 | 1.25 | 1.69895 | 30.1 | |
| 26 | 21.325 | (Variable) | | | |
| 27 | 26.198 | 3.50 | 1.51823 | 58.9 | |

-continued

Unit mm

| | | | | |
|---|---|---|---|---|
| 28 | −16.763 | 0.50 | 2.00069 | 25.5 |
| 29 | −25.878 | (Variable) | | |
| 30 | ∞ | 0.80 | 1.51633 | 64.1 |
| 31 | ∞ | 0.50 | | |
| Image plane | ∞ | | | |

Aspheric surface data

17th surface

K = −2.39707e+000   A 4 = 1.46877e−004   A 6 = −1.24058e−006

18th surface

K = 0.00000e+000   A 4 = 9.15367e−005   A 6 = −1.07874e−006

Various data
Zoom ratio 84.99

| | Wide angle | Middle | Telephoto |
|---|---|---|---|
| Focal length | 3.71 | 19.60 | 315.00 |
| F-number | 3.30 | 4.99 | 8.00 |
| Half angle of view | 40.61 | 11.19 | 0.70 |
| Total lens length | 104.94 | 131.89 | 210.06 |
| BF | 10.01 | 18.80 | 18.31 |
| d 7 | 0.75 | 41.97 | 103.24 |
| d15 | 36.90 | 3.95 | 1.00 |
| d16 | 11.58 | 10.25 | 0.29 |
| d23 | 3.00 | 6.36 | 10.86 |
| d26 | 4.41 | 12.27 | 38.08 |
| d29 | 8.99 | 17.78 | 17.29 |

Zoom lens unit data

| Unit | Start surface | Focal length |
|---|---|---|
| 1 | 1 | 125.97 |
| 2 | 8 | −8.35 |
| 3 | 17 | 15.74 |
| 4 | 24 | −25.11 |
| 5 | 27 | 34.14 |

[Fourth Numerical Example]

Unit mm

Surface Data

| Surface Number | r | d | nd | vd | θdr |
|---|---|---|---|---|---|
| 1 | 100.073 | 1.45 | 1.91082 | 35.3 | 0.582 |
| 2 | 56.672 | 5.50 | 1.49700 | 81.5 | |
| 3 | 1441.561 | 0.05 | | | |
| 4 | 57.631 | 3.90 | 1.43875 | 94.9 | 0.539 |
| 5 | 236.500 | 0.05 | | | |
| 6 | 71.936 | 3.00 | 1.49700 | 81.5 | |
| 7 | 194.066 | (Variable) | | | |
| 8 | 187.880 | 0.75 | 1.88300 | 40.8 | |
| 9 | 8.024 | 3.96 | | | |
| 10 | 106.399 | 0.60 | 1.80400 | 46.6 | |
| 11 | 20.589 | 1.82 | | | |
| 12 | −37.450 | 0.60 | 1.91082 | 35.3 | |
| 13 | 52.631 | 0.10 | | | |
| 14 | 20.058 | 2.00 | 1.95906 | 17.5 | |
| 15 | −186.477 | (Variable) | | | |
| 16 (Stop) | ∞ | (Variable) | | | |
| 17* | 10.985 | 2.75 | 1.55332 | 71.7 | |
| 18* | −288.356 | 1.74 | | | |
| 19 | 17.201 | 0.60 | 1.80400 | 46.6 | |
| 20 | 10.727 | 0.33 | | | |
| 21 | 15.506 | 0.60 | 2.00330 | 28.3 | |
| 22 | 10.364 | 2.40 | 1.49700 | 81.5 | |

-continued

Unit mm

| | | | | |
|---|---|---|---|---|
| 23 | −16.071 | 2.40 | | |
| 24 | 169.261 | 0.50 | 1.78590 | 44.2 |
| 25 | 11.000 | 1.05 | 1.69895 | 30.1 |
| 26 | 19.568 | (Variable) | | |
| 27 | 20.884 | 3.00 | 1.51823 | 58.9 |
| 28 | −15.203 | 0.50 | 2.00069 | 25.5 |
| 29 | −24.317 | (Variable) | | |
| 30 | ∞ | 0.80 | 1.51633 | 64.1 |
| 31 | ∞ | 0.50 | | |
| Image plane | ∞ | | | |

Aspheric surface data

17th surface

K = −3.72856e+000   A 4 = 2.42049e−004   A 6 = −3.92848e−006

18th surface

K = 0.00000e+000   A 4 = 3.47054e−005   A 6 = −2.32073e−006

Various data
Zoom ratio 84.95

| | Wide angle | Middle | Telephoto |
|---|---|---|---|
| Focal length | 3.71 | 15.15 | 315.00 |
| F-number | 3.30 | 4.99 | 7.50 |
| Half angle of view | 40.59 | 14.35 | 0.70 |
| Total lens length | 98.01 | 103.76 | 156.05 |
| BF | 9.56 | 24.21 | 7.53 |
| d 7 | 0.75 | 16.91 | 69.67 |
| d15 | 31.13 | 10.06 | 0.30 |
| d16 | 12.18 | 1.50 | 0.30 |
| d26 | 4.47 | 11.16 | 38.33 |
| d29 | 8.53 | 23.18 | 6.50 |

Zoom lens unit data

| Unit | Start surface | Focal length |
|---|---|---|
| 1 | 1 | 87.07 |
| 2 | 8 | −7.85 |
| 3 | 17 | 20.96 |
| 4 | 27 | 29.56 |

[Fifth Numerical Example]

Unit mm

Surface Data

| Surface Number | r | d | nd | vd | θdr |
|---|---|---|---|---|---|
| 1 | 132.837 | 1.45 | 1.88300 | 40.8 | 0.567 |
| 2 | 51.407 | 5.20 | 1.49700 | 81.5 | |
| 3 | 675.039 | 0.05 | | | |
| 4 | 56.369 | 4.55 | 1.48563 | 85.2 | 0.539 |
| 5 | 350.249 | 0.05 | | | |
| 6 | 71.536 | 2.95 | 1.59282 | 68.6 | |
| 7 | 227.523 | (Variable) | | | |
| 8 | 154.193 | 0.75 | 1.88300 | 40.8 | |
| 9 | 8.101 | 3.70 | | | |
| 10 | 71.490 | 0.60 | 1.80400 | 46.6 | |
| 11 | 20.523 | 1.72 | | | |
| 12 | −34.213 | 0.60 | 1.91082 | 35.3 | |
| 13 | 55.649 | 0.10 | | | |
| 14 | 20.373 | 2.00 | 1.95906 | 17.5 | |
| 15 | −177.406 | (Variable) | | | |
| 16 (Stop) | ∞ | (Variable) | | | |
| 17* | 10.761 | 2.90 | 1.55332 | 71.7 | |
| 18* | 1343.314 | 0.94 | | | |
| 19 | 15.160 | 0.60 | 1.80400 | 46.6 | |

-continued

Unit mm

| | | | | |
|---|---|---|---|---|
| 20 | 10.507 | 0.52 | | |
| 21 | 16.852 | 0.60 | 2.00330 | 28.3 |
| 22 | 10.656 | 2.95 | 1.49700 | 81.5 |
| 23 | -16.918 | 2.69 | | |
| 24 | 228.680 | 0.50 | 1.78590 | 44.2 |
| 25 | 11.000 | 1.20 | 1.69895 | 30.1 |
| 26 | 21.159 | (Variable) | | |
| 27 | 24.600 | 3.20 | 1.51823 | 58.9 |
| 28 | -13.067 | 0.50 | 2.00069 | 25.5 |
| 29 | -19.215 | (Variable) | | |
| 30 | -35.000 | 1.00 | 1.51633 | 64.1 |
| 31 | ∞ | 0.49 | | |
| 32 | ∞ | 0.50 | 1.51633 | 64.1 |
| 33 | ∞ | 0.50 | | |
| Image plane | ∞ | | | |

Aspheric surface data

17th surface $K = -1.07569e+000$  $A4 = 2.92492e-005$  $A6 = -2.00935e-007$

18th surface $K = 0.00000e+000$  $A4 = 6.74353e-005$  $A6 = -5.86495e-007$

Various data
Zoom ratio 84.94

| | Wide angle | Middle | Telephoto |
|---|---|---|---|
| Focal length | 3.71 | 36.83 | 315.00 |
| F-number | 3.30 | 4.99 | 7.50 |
| Half angle of view | 40.59 | 6.01 | 0.70 |
| Total lens length | 100.35 | 135.60 | 159.10 |
| BF | 1.32 | 1.32 | 1.32 |
| d 7 | 0.75 | 45.29 | 72.12 |
| d15 | 32.25 | 1.05 | 0.28 |
| d16 | 12.89 | 5.37 | 0.28 |
| d26 | 4.22 | 12.07 | 37.62 |
| d29 | 7.43 | 29.03 | 5.99 |

Zoom lens unit data

| Unit | Start surface | Focal length |
|---|---|---|
| 1 | 1 | 88.52 |
| 2 | 8 | -8.13 |
| 3 | 17 | 21.12 |
| 4 | 27 | 27.98 |
| 5 | 30 | -67.79 |

[Sixth Numerical Example]

Unit mm

Surface Data

| Surface Number | r | d | nd | vd | θdr |
|---|---|---|---|---|---|
| 1 | 124.862 | 1.45 | 1.88300 | 40.8 | 0.567 |
| 2 | 51.095 | 5.40 | 1.49700 | 81.5 | |
| 3 | 870.523 | 0.05 | | | |
| 4 | 54.702 | 5.00 | 1.45600 | 90.3 | 0.534 |
| 5 | 752.199 | 0.05 | | | |
| 6 | 73.662 | 2.70 | 1.59282 | 68.6 | |
| 7 | 191.888 | (Variable) | | | |
| 8 | 282.966 | 0.75 | 1.88300 | 40.8 | |
| 9 | 8.030 | 3.78 | | | |
| 10 | 74.646 | 0.60 | 1.80400 | 46.6 | |
| 11 | 20.244 | 1.78 | | | |
| 12 | -33.432 | 0.60 | 1.91082 | 35.3 | |
| 13 | 55.047 | 0.10 | | | |

-continued

Unit mm

| | | | | |
|---|---|---|---|---|
| 14 | 20.037 | 2.00 | 1.95906 | 17.5 |
| 15 | -165.507 | (Variable) | | |
| 16 (Stop) | ∞ | (Variable) | | |
| 17* | 11.583 | 2.60 | 1.55332 | 71.7 |
| 18* | -4502.227 | 1.99 | | |
| 19 | 15.088 | 0.60 | 1.80400 | 46.6 |
| 20 | 10.931 | 0.34 | | |
| 21 | 17.086 | 0.60 | 2.00330 | 28.3 |
| 22 | 10.789 | 2.30 | 1.49700 | 81.5 |
| 23 | -16.030 | 2.68 | | |
| 24 | 249.758 | 0.50 | 1.78590 | 44.2 |
| 25 | 11.000 | 0.95 | 1.69895 | 30.1 |
| 26 | 20.015 | (Variable) | | |
| 27 | 22.084 | 2.70 | 1.51823 | 58.9 |
| 28 | -17.862 | 0.50 | 2.00069 | 25.5 |
| 29 | -28.637 | (Variable) | | |
| 30 | 50.000 | 1.50 | 1.51633 | 64.1 |
| 31 | ∞ | 0.48 | | |
| 32 | ∞ | 0.50 | 1.51633 | 64.1 |
| 33 | ∞ | 0.50 | | |
| Image plane | ∞ | | | |

Aspheric surface data

17th surface $K = -3.88321e+000$  $A4 = 2.42441e-004$  $A6 = -2.97008e-006$

18th surface $K = 0.00000e+000$  $A4 = 6.64524e-005$  $A6 = -1.47813e-006$

Various data
zoom ratio 85.05

| | Wide angle | Middle | Telephoto |
|---|---|---|---|
| Focal length | 3.70 | 36.65 | 315.00 |
| F-number | 3.30 | 5.49 | 7.50 |
| Half angle of view | 40.63 | 6.04 | 0.70 |
| Total lens length | 101.97 | 138.03 | 160.71 |
| BF | 1.31 | 1.31 | 1.31 |
| d 7 | 0.75 | 44.52 | 70.01 |
| d15 | 32.79 | 6.20 | 1.09 |
| d16 | 12.41 | 2.04 | 0.32 |
| d26 | 5.78 | 11.87 | 40.31 |
| d29 | 7.23 | 30.40 | 5.98 |

Zoom lens unit data

| Unit | Start surface | Focal length |
|---|---|---|
| 1 | 1 | 86.24 |
| 2 | 8 | -7.85 |
| 3 | 17 | 21.40 |
| 4 | 27 | 32.16 |
| 5 | 30 | 96.84 |

TABLE 1

|  | First exemplary embodiment | Second exemplary embodiment | Third exemplary embodiment | Fourth exemplary embodiment | Fifth exemplary embodiment | Sixth exemplary embodiment |
| --- | --- | --- | --- | --- | --- | --- |
| vd1p | 94.9 | 94.9 | 94.9 | 94.9 | 85.2 | 90.3 |
| θgF1P | 0.534 | 0.534 | 0.534 | 0.534 | 0.539 | 0.534 |
| M1/fW | 14.89 | 8.18 | 28.36 | 15.72 | 15.82 | 15.86 |
| DW/DT | 16.92 | 56.17 | 40.26 | 40.62 | 45.45 | 38.95 |
| f1/fW | 23.7 | 20.36 | 33.99 | 23.48 | 23.87 | 23.29 |
| fT/f1 | 3.58 | 4.07 | 2.50 | 3.62 | 3.56 | 3.65 |
| f1/f2 | 11.61 | 9.63 | 15.08 | 11.09 | 10.89 | 10.99 |
| f1/f3 | 5.46 | 4.90 | 8.01 | 4.15 | 4.19 | 4.03 |
| f2/fT | 0.024 | 0.026 | 0.027 | 0.025 | 0.026 | 0.025 |
| (R1 − R2)/(R1 + R2) | −0.939 | −0.754 | −0.643 | — | — | — |
| (R1 − R2)/(R1 + R2) | −0.675 | −0.513 | −0.683 | −0.608 | −0.723 | −0.864 |
| (R1 − R2)/(R1 + R2) | −0.572 | −0.611 | −0.612 | — | — | — |
| (R1 − R2)/(R1 + R2) | — | −0.490 | — | — | — | — |
| θgF1N | 0.567 | 0.567 | 0.567 | 0.582 | 0.567 | 0.567 |
| vd1N | 40.76 | 40.76 | 40.76 | 35.25 | 40.76 | 40.76 |
| Left side of conditional expression (13) | 0.567 | 0.567 | 0.567 | 0.582 | 0.567 | 0.567 |
| Right side of conditional expression (13) | 0.573 | 0.573 | 0.573 | 0.584 | 0.573 | 0.573 |
| nd1N | 1.883 | 1.883 | 1.883 | 1.911 | 1.883 | 1.883 |

Next, an exemplary embodiment of a digital still camera using a zoom lens of an exemplary embodiment of the present invention as an imaging optical system will be described with reference to FIG. 13. FIG. 13 illustrates a camera body 20, and an imaging optical system 21 configured from any of the zoom lenses described in the first to sixth exemplary embodiments. A solid-state image sensor (photoelectric conversion element) 22, such as a CCD sensor or a CMOS sensor, housed in the camera body, and receives light from an object image formed by the photographic optical system 21. A memory 23 records information of an image corresponding to the object image photoelectrically converted by the solid-state image sensor 22. A viewfinder 24 is configured from a liquid crystal display panel, and the like, and observes the object image formed on the solid-state image sensor 22. By applying the zoom lens of an exemplary embodiment of the present invention to an imaging apparatus, such as a digital still camera, a small imaging apparatus having high magnification and a wide viewing angle with favorably corrected chromatic aberration can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-245002 filed Nov. 27, 2013, which is hereby incorporated by reference herein in its entirety.

What is claimed is:

1. A zoom lens comprising, in order from an object side to an image side:
a first lens unit having positive refractive power;
a second lens unit having negative refractive power;
a third lens unit having positive refractive power; and
a rear lens group including one or more lens units,
wherein an interval between adjacent lens units is changed in zooming,
wherein the first lens unit is positioned closer to the object side at a telephoto end than at a wide-angle end,
the first lens unit includes at least four lenses,
the first lens unit includes one or more positive lenses using a material that satisfies a conditional expression of $85.0 < vd1P < 100.0$ where an Abbe number of materials of positive lenses included in the first lens unit is vd1P, and
conditional expressions of $5.0 < M1/fW < 40.0$ $0.010 < |f2|/fT < 0.030$ are satisfied, where a focal length of the zoom lens at the wide-angle end is fW, an amount of movement of the first lens unit on an optical axis in zooming from a wide-angle end to a telephoto end is M1, a focal length of the second lens unit is f2, and a focal length of the zoom lens at the telephoto end is fT.

2. The zoom lens according to claim 1, wherein a conditional expression of $0.520 < \theta gF1P < 0.580$ is satisfied where relative partial dispersion of the material of the positive lens using the material that satisfies the conditional expression of $85.0 < vd1P < 100.0$ among positive lenses arranged in the first lens unit is θgF1P.

3. The zoom lens according to claim 1, further comprising an aperture stop disposed between the second lens unit and the third lens unit,
wherein the aperture stop is moved with a locus different from the loci drawn by the lens units in zooming, and wherein a conditional expression of $$10.0 < DW/DT < 100.0$$

is satisfied where an interval between the aperture stop and the third lens unit on the optical axis at the wide-angle end is DW, and an interval between the aperture stop and the third lens unit on the optical axis at the telephoto end is DT.

4. The zoom lens according to claim 1, wherein a conditional expression of $$15.0 < f1/fW < 40.0$$

is satisfied, where a focal length of the first lens unit is f1.

5. The zoom lens according to claim 1, wherein a conditional expression of $$2.0 < fT/f1 < 6.0$$

is satisfied, where a focal length of the first lens unit is f1, and a focal length of the zoom lens at the telephoto end is fT.

6. The zoom lens according to claim 1, wherein a conditional expression of $$3.0 < f1/f3 < 10.0$$

is satisfied, where a focal length of the first lens unit is f1, and a focal length of the third lens unit is f3.

7. The zoom lens according to claim 1, wherein the first lens unit includes, in order from the object side to the image side, a negative lens, a first positive lens, a second positive lens, and a third positive lens.

8. The zoom lens according to claim 1, wherein a conditional expression of $$-1.00 < (R1-R2)/(R1+R2) < 0.00$$

is satisfied where a curvature radius of an object-side lens surface of the positive lens using the material that satisfies the conditional expression of $$85.0 < vd1P < 100.0$$

is R1, and a curvature radius of an image-side lens surface of the positive lens is R2, among positive lenses arranged in the first lens unit.

9. The zoom lens according to claim 1, wherein conditional expressions of $$35.0 < vd1N < 50.0$$

$$0.520 < \theta gF1N < 0.750$$

$$\theta gF1N < -0.00203 \times vd1N + 0.656$$

are satisfied where relative partial dispersion of a material of a negative lens arranged in the first lens unit is θgF1N, and an Abbe number of the negative lens arranged in the first lens unit is vd1N.

10. The zoom lens according to claim 1, wherein a conditional expression of $$1.75 < nd1N < 2.10$$

is satisfied where a refractive index of a material of a negative lens arranged in the first lens unit is nd1N.

11. The zoom lens according to claim 1, wherein the second lens unit includes three or more negative lenses.

12. The zoom lens according to claim 1, wherein the rear lens group consists of a fourth lens unit having positive refractive power.

13. The zoom lens according to claim 1, wherein the rear lens group consists of a fourth lens unit having positive refractive power and a fifth lens unit having positive refractive power.

14. The zoom lens according to claim 1, wherein the rear lens group consists of a fourth lens unit having positive refractive power and a fifth lens unit having negative refractive power.

15. The zoom lens according to claim 1, wherein the rear lens group consists of a fourth lens unit having negative refractive power and a fifth lens unit having positive refractive power.

16. The zoom lens according to claim 1, wherein a conditional expression of $$7.0 < f1/|f2| < 20.0$$

is satisfied, where a focal length of the first lens unit is f1.

17. An imaging apparatus comprising:
a zoom lens; and
an image sensor configured to receive an image formed by the zoom lens,
wherein the zoom lens comprises, in order from an object side to an image side:
a first lens unit having positive refractive power,
a second lens unit having negative refractive power,
a third lens unit having positive refractive power, and
a rear group including one or more lens units,
wherein an interval between adjacent lens units is changed in zooming,
the first lens unit is positioned closer to the object side at a telephoto end than at a wide-angle end,
the first lens unit includes at least four lenses,
the first lens unit includes one or more positive lenses using a material that satisfies $$85.0 < vd1P < 100.0$$

where an Abbe number of materials of positive lenses included in the first lens unit is vd1P, and
conditional expressions of $$5.0 < M1/fW < 40.0$$

$$0.010 < |f2|/fT < 0.030$$

are satisfied where a focal length of the zoom lens at the wide-angle end is fW, an amount of movement of the first lens unit on an optical axis at zooming from a wide-angle end to a telephoto end is M1, and a focal length of the second lens unit is f2, and a focal length of the zoom lens at the telephoto end is fT.

18. A zoom lens comprising, in order from an object side to an image side:
a first lens unit having positive refractive power;
a second lens unit having negative refractive power;
a third lens unit having positive refractive power; and
a rear lens group including one or more lens units,
wherein an interval between adjacent lens units is changed in zooming,
wherein the first lens unit is positioned closer to the object side at a telephoto end than at a wide-angle end,
the first lens unit includes at least four lenses,
the first lens unit includes one or more positive lenses using a material that satisfies a conditional expression of $$85.0 < vd1P < 100.0$$

where an Abbe number of materials of positive lenses included in the first lens unit is vd1P, and
a conditional expression of $$14.89 \leq M1/fW < 40.0$$

is satisfied where a focal length of the zoom lens at the wide-angle end is fW, and an amount of movement of the first lens unit on an optical axis in zooming from a wide-angle end to a telephoto end is M1.

* * * * *